US012701522B2

(12) United States Patent
Nagano et al.

(10) Patent No.: US 12,701,522 B2
(45) Date of Patent: Aug. 4, 2026

(54) COMMUNICATION APPARATUS, BASE STATION, AND COMMUNICATION METHOD FOR NON-CELL DEFINING SSB

(71) Applicants:DENSO CORPORATION, Kariya-city (JP); TOYOTA JIDOSHA KABUSHIKI KAISHA, Toyota (JP)

(72) Inventors: Tatsuki Nagano, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 18/649,934

(22) Filed: Apr. 29, 2024

(65) Prior Publication Data

US 2024/0284367 A1 Aug. 22, 2024

Related U.S. Application Data

(63) Continuation of application No. PCT/JP2022/040010, filed on Oct. 26, 2022.

(30) Foreign Application Priority Data

Nov. 2, 2021 (JP) ................................. 2021-179813

(51) Int. Cl.
| | |
|---|---|
| *H04W 56/00* | (2009.01) |
| *H04L 43/0811* | (2022.01) |
| *H04W 72/0457* | (2023.01) |
| *H04W 76/20* | (2018.01) |

(52) U.S. Cl.
CPC ..... *H04W 56/0015* (2013.01); *H04L 43/0811* (2013.01); *H04W 72/0457* (2023.01); *H04W 76/20* (2018.02)

(58) Field of Classification Search
None
See application file for complete search history.

(56) References Cited

U.S. PATENT DOCUMENTS

| | | | |
|---|---|---|---|
| 2022/0022064 A1* | 1/2022 | Raghavan | .............. H04W 24/02 |
| 2023/0054786 A1* | 2/2023 | Islam | .................... H04W 28/20 |

OTHER PUBLICATIONS

R1-2106563, 3GPP TSG-RAN WG1 Meeting #106-e, Reduced maximum UE bandwidth for RedCap, Ericsson, e-Meeting, Aug. 16-27, 2021, pp. 1-21.

(Continued)

*Primary Examiner* — Anh Ngoc M Nguyen
(74) *Attorney, Agent, or Firm* — Harness, Dickey & Pierce, P.L.C.

(57) ABSTRACT

A communication apparatus includes: a receiver configured to receive, from a base station, configuration information including a synchronization signal/physical broadcast channel block (SSB) index indicating an SSB to be referred to for performing at least one of operations of radio link monitoring (RLM) and beam failure detection (BFD); and a controller configured to perform the at least one operation with reference to the SSB indicated by the SSB index. The controller is configured to specify the SSB indicated by the SSB index as a non-cell-defining SSB in a case where an absolute radio-frequency channel number indicating a frequency location at which the non-cell-defining SSB is transmitted is received.

15 Claims, 32 Drawing Sheets

(56) References Cited

OTHER PUBLICATIONS

R1-2106601, 3GPP TSG RAN WG1 #106-e, Discussion on reduced maximum UE bandwidth, vivo, Guangdong Genius, e-Meeting, Aug. 16- 7, 2021, pp. 1-9.

R2-2109451, 3GPP TSG-RAN WG2 Meeting #116-e, NCD-SSB and RedCap-specific BWPs, Qualcomm Incorporated, Online, Nov. 1-12, 2021, pp. 1-7.

R2-2109576, 3GPP TSG-RAN WG2 Meeting #116 electronic, Definition and reduced capabilities for RedCap UE, and NCD-SSB related LS, Huawei, HiSilicon, Electronic meeting, Nov. 1-12, 2021, pp. 1-7.

R2-2109741, 3GPP TSG-RAN WG2 Meeting #116-e, Discussion on NCD SSB and UE type for RedCap UEs, vivo, Guangdong Genius, Electronic, Nov. 1-Nov. 12, 2021, pp. 1-10.

R2-2110727, 3GPP TSG RAN WG2 #116-e, LS on use of NCD-SSB instead of CD-SSB for RedCap UE (R1-2110600; contact: Ericsson) RAN1, e-Meeting, Nov. 1-12, 2021, pp. 1-2.

R2-2110095, 3GPP TSG-RAN WG2 Meeting #116-e, Making ND-SSB work for RedCap in Rel-17, Apple, Electronic, Nov. 1-Nov. 12, 2021, pp. 1-7.

3GPP TS38.213 V16.7.0 (Sep. 2021), 3rd Generation Partnership Project; Technical Specification Group Radio Access Network; NR; Physical layer procedures for control (Release 16), pp. 1-188.

3GPP TS38.214 V16.7.0 (Sep. 2021), 3rd Generation Partnership Project; Technical Specification Group Radio Access Network; NR; Physical layer procedures for data (Release 16), pp. 1-172.

3GPP TS38.300 V16.7.0 (Sep. 2021), 3rd Generation Partnership Project; Technical Specification Group Radio Access Network; NR; NR and NG-RAN Overall Description; Stage 2 (Release 16), pp. 1-152.

R2-2110773, eg 3GPP TSG-RAN kWG2 #116-e, Use of NCD-SSB instead of CD-SSB for RedCap UEs, Ericsson, Electronic meeting, Nov. 1-12, 2021, pp. 1-7.

3GPP TS38.331 V16.6.0 (Sep. 2021), 3rd Generation Partnership Project; Technical Specification Group Radio Access Network; NR; Radio Resource Control (RRC) protocol specification (Release 16), pp. 1-961.

* cited by examiner

FIG. 3

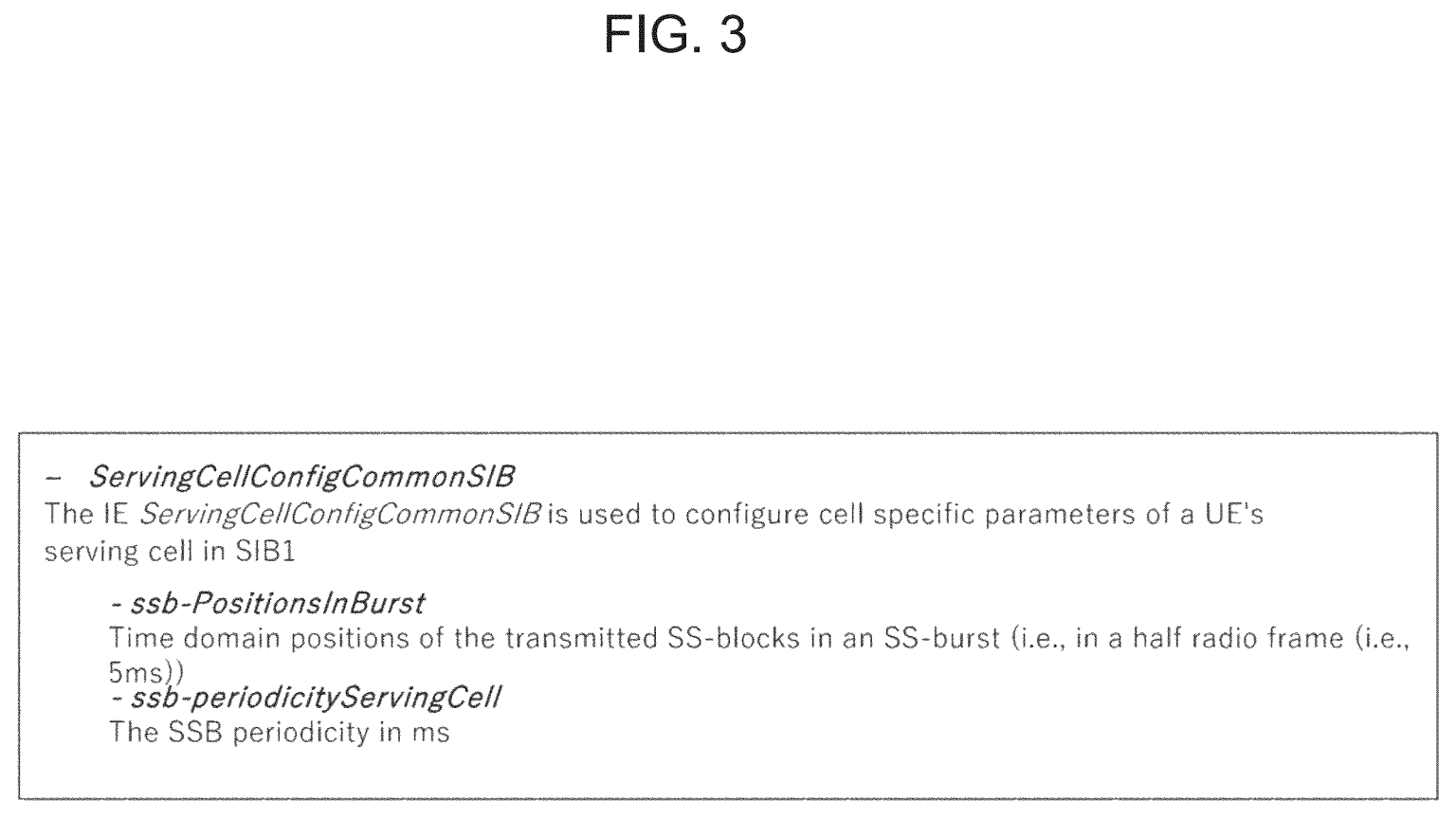

- *ServingCellConfigCommonSIB*
- The IE *ServingCellConfigCommonSIB* is used to configure cell specific parameters of a UE's serving cell in SIB1

- *ssb-PositionsInBurst*
  Time domain positions of the transmitted SS-blocks in an SS-burst (i.e., in a half radio frame (i.e., 5ms))
  - *ssb-periodicityServingCell*
  The SSB periodicity in ms

BASE STATION

200

210 COMMUNICATOR

211 TRANSMITTER

212 RECEI ER

230 CONTROLLER

220 NETWOR INTERFACE

FIG. 9

PUCCH-SpatialRelationInfo information element

```
PUCCH-SpatialRelationInfo ::=        SEQUENCE {                                             1101
    pucch-SpatialRelationInfoId          PUCCH-SpatialRelationInfoId,                        1102
    servingCellId                        ServCellIndex                     OPTIONAL,    -- Need S
    referenceSignal                      CHOICE {                                            1103
        ssb-Index                            SSB-Index,
        csi-RS-Index                         NZP-CSI-RS-ResourceId,
        srs                                  PUCCH-SRS
    },
    pucch-PathlossReferenceRS-Id         PUCCH-PathlossReferenceRS-Id,
    p0-PUCCH-Id                          P0-PUCCH-Id,
    closedLoopIndex                      ENUMERATED { i0, i1 }
}

PUCCH-SpatialRelationInfoExt-r16 ::=  SEQUENCE {
    pucch-SpatialRelationInfoId-v1610        PUCCH-SpatialRelationInfoId-v1610    OPTIONAL,   -- Cond SetupOnly
    pucch-PathlossReferenceRS-Id-v1610       PUCCH-PathlossReferenceRS-Id-v1610   OPTIONAL,   --Need R
    ...,
    [[
    ssbFrequency-r17                         ARFCN-ValueNR                        OPTIONAL,   -- Cond NCD-SSB    1104
    ssbSubcarrierSpacing-r17                 SubcarrierSpacing                    OPTIONAL,   -- Cond NCD-SSB    1105
    ssb-DL-BWP-r17                           BWP-Id                               OPTIONAL,   -- Cond NCD-SSB    1106
    ssb-Type-r17                             ENUMERATED {ncd-ssb, cd-ssb}         OPTIONAL,   -- Cond NCD-SSB    1107
    ]]
}

PUCCH-SRS ::=                          SEQUENCE {
    resource                             SRS-ResourceId,
    uplinkBWP                            BWP-Id
}
```

FIG. 10

| PUCCH-SpatialRelationInfo field descriptions |
| --- |
| *pucch-PathLossReferenceRS-Id* |
| When *pucch-PathLossReferenceRS-Id-v1610* is configured, the UE shall ignore *pucch-PathLossReferenceRS-Id* (without suffix). |
| *pucch-SpatialRelationInfold* |
| When *pucch-SpatialRelationInfold-v1610* is configured, the UE shall ignore *pucch-SpatialRelationInfold* (without suffix). |
| *servingCellId* |
| If the field is absent, the UE applies the *ServCellId* of the serving cell in which this *PUCCH-SpatialRelationInfo* is configured |
| *ssbFrequency* |
| Indicates the frequency of SSB, if SSB is used for the RS for PUCCH spatial relation. |
| *ssbSubcarrierSpacing* |
| Indicates the sub-carrier spacing of SSB, if SSB is used for the RS for PUCCH spatial relation. |
| *ssb-DL-BWP* |
| Indicates the DL BWP where SSB is transmitted, if SSB is used for the RS for PUCCH spatial relation. |
| *ssb-Type* |
| Indicates the SSB type used for the RS for PUCCH spatial relation. |

| Conditional Presence | Explanation |
| --- | --- |
| NCD-SSB | This field is mandatory present, Need M, if non-CD-SSB is transmitted on the separate initial DL BWP configured for RedCap UE. It is absent, otherwise. |

FIG. 12

*SRS-Config* information element

```
SRS-Config ::=                              SEQUENCE {
    srs-ResourceSetToReleaseList                SEQUENCE (SIZE(1..maxNrofSRS-ResourceSets)) OF SRS-ResourceSetId    OPTIONAL,    -- Need N
    srs-ResourceSetToAddModList                 SEQUENCE (SIZE(1..maxNrofSRS-ResourceSets)) OF SRS-ResourceSet      OPTIONAL,    -- Need N
    srs-ResourceToReleaseList                   SEQUENCE (SIZE(1..maxNrofSRS-Resources)) OF SRS-ResourceId          OPTIONAL,    -- Need N
    srs-ResourceToAddModList                    SEQUENCE (SIZE(1..maxNrofSRS-Resources)) OF SRS-Resource            OPTIONAL,    -- Need N
    tpc-Accumulation                            ENUMERATED {disabled}                                              OPTIONAL,    -- Need S
    ...
}

SRS-ResourceSet ::=                         SEQUENCE {
    srs-ResourceSetId                           SRS-ResourceSetId,
    srs-ResourceIdList                          SEQUENCE (SIZE(1..maxNrofSRS-ResourcesPerSet)) OF SRS-ResourceId    OPTIONAL,    -- Cond Setup
    ...
}

SRS-Resource ::=                            SEQUENCE {
    srs-ResourceId                              SRS-ResourceId,
    ...
    spatialRelationInfo                         SRS-SpatialRelationInfo                                            OPTIONAL,    -- Need R
    ...                                                          ~1201
    [[
    spatialRelationInfoExt-r17                  SRS-SpatialRelationInfoExt-r17                                     OPTIONAL,    -- Need R
    ]]
}

SRS-SpatialRelationInfo ::=                 SEQUENCE {
    servingCellId        ~1202                  ServCellIndex
    referenceSignal      ~1203                  CHOICE {
        ssb-Index                                   SSB-Index,
        csi-RS-Index                                NZP-CSI-RS-ResourceId,
        srs                                         SEQUENCE {
            resourceId                                  SRS-ResourceId,
            uplinkBWP                                   BWP-Id
        }                                                                                                          OPTIONAL,    -- Need S
    }
}

SRS-SpatialRelationInfoExt-r17 ::=          SEQUENCE {
    ssbFrequency-r17        ~1204 ~1205          ARFCN-ValueNR
    ssbSubcarrierSpacing-r17                    SubcarrierSpacing                                                  OPTIONAL,    -- Cond NCD-SSB
    ssb-DL-BWP-r17   ~1206                       BWP-Id                                                            OPTIONAL,    -- Cond NCD-SSB
    ssb-Type-r17     ~1207                       ENUMERATED {ncd-ssb, cd-ssb}                                      OPTIONAL,    -- Cond NCD-SSB
    ...                                                                                                            OPTIONAL,    -- Cond NCD-SSB
}
```

FIG. 13

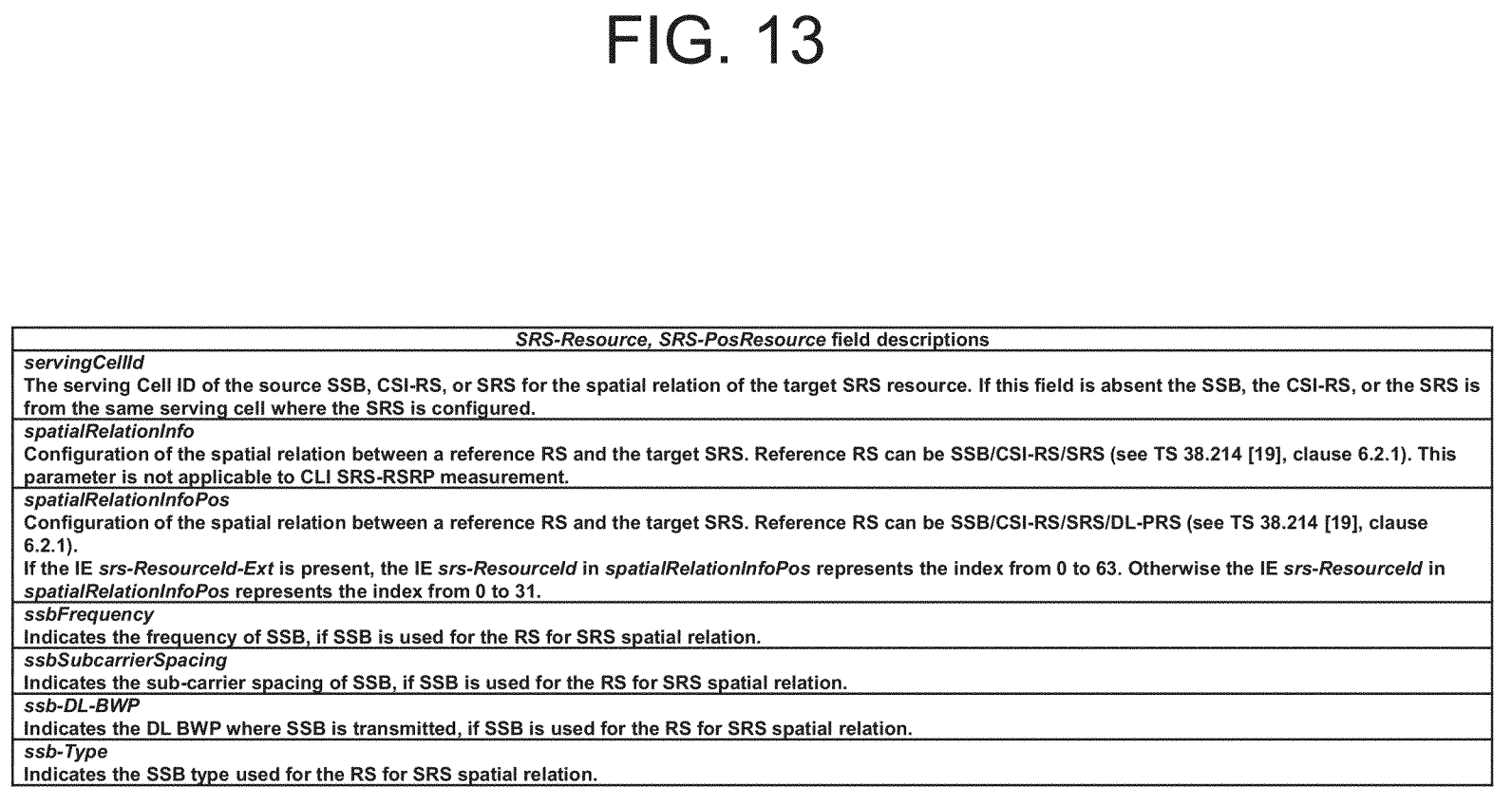

SRS-Resource, SRS-PosResource field descriptions

*servingCellId*
The serving Cell ID of the source SSB, CSI-RS, or SRS for the spatial relation of the target SRS resource. If this field is absent the SSB, the CSI-RS, or the SRS is from the same serving cell where the SRS is configured.

*spatialRelationInfo*
Configuration of the spatial relation between a reference RS and the target SRS. Reference RS can be SSB/CSI-RS/SRS (see TS 38.214 [19], clause 6.2.1). This parameter is not applicable to CLI SRS-RSRP measurement.

*spatialRelationInfoPos*
Configuration of the spatial relation between a reference RS and the target SRS. Reference RS can be SSB/CSI-RS/SRS/DL-PRS (see TS 38.214 [19], clause 6.2.1).
If the IE *srs-ResourceId-Ext* is present, the IE *srs-ResourceId* in *spatialRelationInfoPos* represents the index from 0 to 63. Otherwise the IE *srs-ResourceId* in *spatialRelationInfoPos* represents the index from 0 to 31.

*ssbFrequency*
Indicates the frequency of SSB, if SSB is used for the RS for SRS spatial relation.

*ssbSubcarrierSpacing*
Indicates the sub-carrier spacing of SSB, if SSB is used for the RS for SRS spatial relation.

*ssb-DL-BWP*
Indicates the DL BWP where SSB is transmitted, if SSB is used for the RS for SRS spatial relation.

*ssb-Type*
Indicates the SSB type used for the RS for SRS spatial relation.

Figure 14:
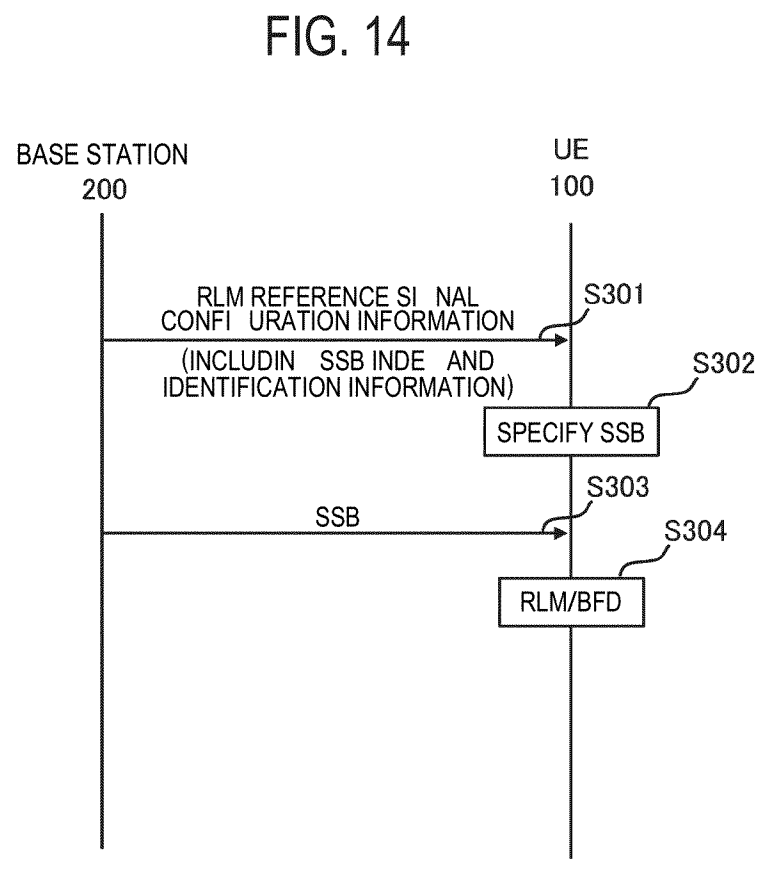

BASE STATION
200

S301

RLM REFERENCE SI NAL
CONFI URATION INFORMATION (INCLUDIN  SSB INDE  AND
IDENTIFICATION INFORMATION)

S302

SPECIFY SSB

S303

SSB

S304

RLM/BFD

FIG. 15

*RadioLinkMonitoringConfig information element*

```
RadioLinkMonitoringConfig ::=          SEQUENCE {
    failureDetectionResourcesToAddModList   SEQUENCE (SIZE(1..maxNrofFailureDetectionResources)) OF RadioLinkMonitoringRS
                                                                                        OPTIONAL,  -- Need N
    failureDetectionResourcesToReleaseList  SEQUENCE (SIZE(1..maxNrofFailureDetectionResources)) OF RadioLinkMonitoringRS-Id
                                                                                        OPTIONAL,  -- Need N
    beamFailureInstanceMaxCount             ENUMERATED {n1, n2, n3, n4, n5, n6, n8, n10}  OPTIONAL,  -- Need R
    beamFailureDetectionTimer               ENUMERATED {pbfd1, pbfd2, pbfd3, pbfd4, pbfd5, pbfd6, pbfd8, pbfd10}
                                                                                        OPTIONAL,  -- Need R
    ...
}

1301
RadioLinkMonitoringRS ::=          SEQUENCE {
    radioLinkMonitoringRS-Id            RadioLinkMonitoringRS-Id,
    purpose                             ENUMERATED {beamFailure, rlf, both},
    detectionResource   1302            CHOICE {
        ssb-Index                           SSB-Index,
        csi-RS-Index                        NZP-CSI-RS-ResourceId
    },
    ...,
    [[
    ssbFrequency-r17         1303       ARFCN-ValueNR                           OPTIONAL,  -- Cond NCD-SSB
    ssbSubcarrierSpacing-r17 1304       SubcarrierSpacing                       OPTIONAL,  -- Cond NCD-SSB
    ssb-DL-BWP-r17           1305       BWP-Id                                  OPTIONAL,  -- Cond NCD-SSB
    ssb-Type-r17             1306       ENUMERATED {ncd-ssb, cd-ssb}            OPTIONAL,  -- Cond NCD-SSB
    ]]
}
```

FIG. 16

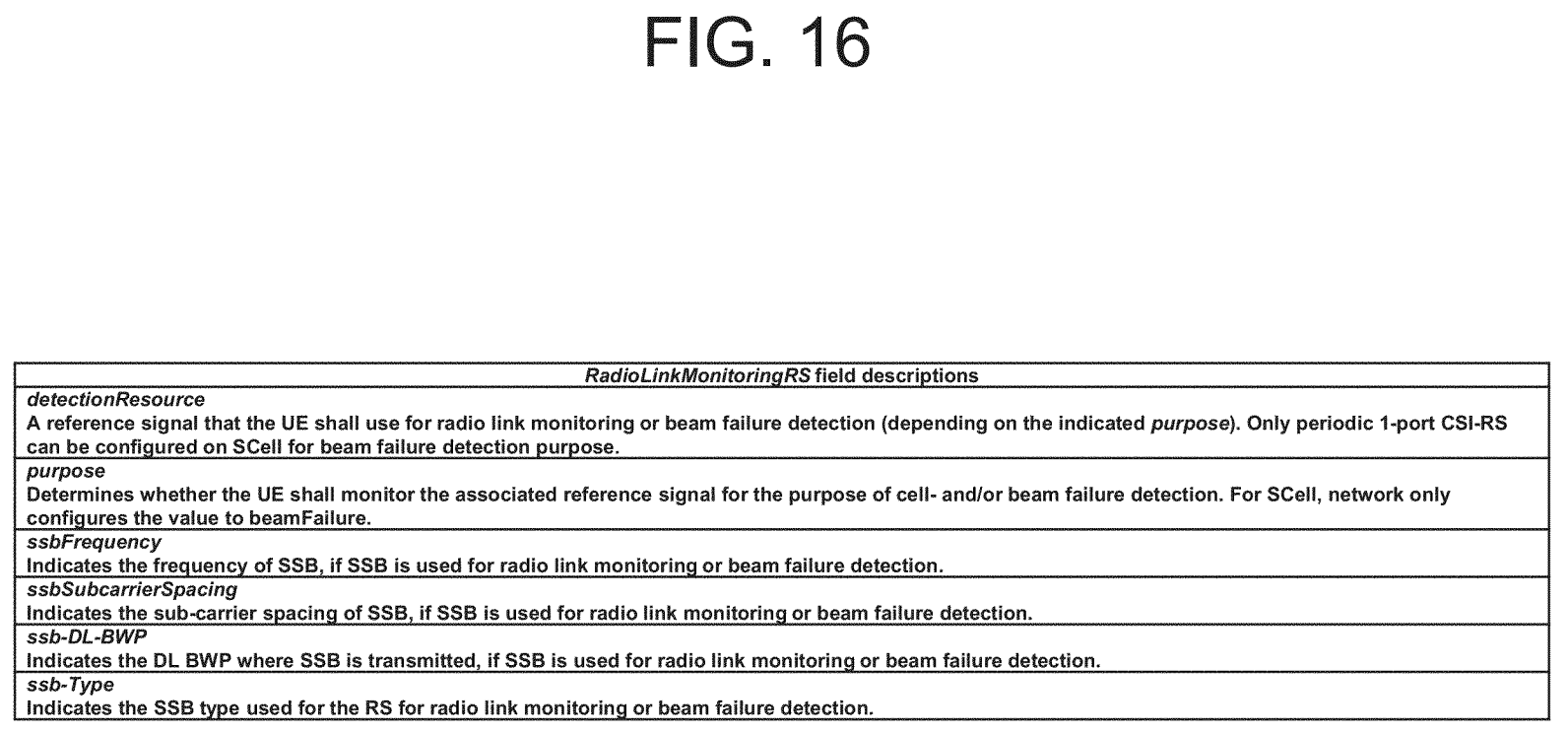

*RadioLinkMonitoringRS* field descriptions

*detectionResource*
A reference signal that the UE shall use for radio link monitoring or beam failure detection (depending on the indicated *purpose*). Only periodic 1-port CSI-RS can be configured on SCell for beam failure detection purpose.

*purpose*
Determines whether the UE shall monitor the associated reference signal for the purpose of cell- and/or beam failure detection. For SCell, network only configures the value to beamFailure.

*ssbFrequency*
Indicates the frequency of SSB, if SSB is used for radio link monitoring or beam failure detection.

*ssbSubcarrierSpacing*
Indicates the sub-carrier spacing of SSB, if SSB is used for radio link monitoring or beam failure detection.

*ssb-DL-BWP*
Indicates the DL BWP where SSB is transmitted, if SSB is used for radio link monitoring or beam failure detection.

*ssb-Type*
Indicates the SSB type used for the RS for radio link monitoring or beam failure detection.

FIG. 18

```
PUCCH-PowerControl information element

PUCCH-PowerControl ::=            SEQUENCE {
    deltaF-PUCCH-F0               INTEGER (-16..15)                                                         OPTIONAL,   -- Need R
    ...,
    deltaF-PUCCH-F4               INTEGER (-16..15)                                                         OPTIONAL,   -- Need R
    p0-Set                       SEQUENCE (SIZE (1..maxNrofPUCCH-P0-PerSet)) OF P0-PUCCH                    OPTIONAL,   -- Need M
    pathlossReferenceRSs         SEQUENCE (SIZE (1..maxNrofPUCCH-PathlossReferenceRSs)) OF PUCCH-PathlossReferenceRS
                                                                                                           OPTIONAL,   -- Need M
    twoPUCCH-PC-AdjustmentStates ENUMERATED {twoStates}                                                    OPTIONAL,   -- Need S
    ...,
    [[
    pathlossReferenceRSs-v1610   SetupRelease { PathlossReferenceRSs-v1610 }                               OPTIONAL    -- Need M
    ]],
    [[
    pathlossReferenceRSs-v17xy   SetupRelease { PathlossReferenceRSs-v17xy }                               OPTIONAL    -- Need M
    ]]
}
...

PathlossReferenceRSs-v1610 ::=   SEQUENCE (SIZE (1..maxNrofPUCCH-PathlossReferenceRSsDiff-r16)) OF PUCCH-PathlossReferenceRS-r16
PathlossReferenceRSs-v17xy ::=   SEQUENCE (SIZE (1..maxNrofPUCCH-PathlossReferenceRSsDiff-r16)) OF PUCCH-PathlossReferenceRS-r17

PUCCH-PathlossReferenceRS ::=    SEQUENCE {
    pucch-PathlossReferenceRS-Id     PUCCH-PathlossReferenceRS-Id,
    referenceSignal                  CHOICE {
        ssb-Index                    SSB-Index,
        csi-RS-Index                 NZP-CSI-RS-ResourceId
    }
}

1401
PUCCH-PathlossReferenceRS-r17 ::= SEQUENCE {
    pucch-PathlossReferenceRS-Id-r17  PUCCH-PathlossReferenceRS-Id-v1610,
    referenceSignal-r17               CHOICE {
        ssb-r17          1402        SEQUENCE {
            ssbFrequency-r17             1403  ARFCN-ValueNR                                                OPTIONAL,   -- Cond NCD-SSB
            ssbSubcarrierSpacing-r17           SubcarrierSpacing                                           OPTIONAL,   -- Cond NCD-SSB
            ssb-DL-BWP-r17       1404          BWP-Id                                                      OPTIONAL,   -- Cond NCD-SSB
            ssb-Type-r17                       ENUMERATED (ncd-ssb, cd-ssb)                                OPTIONAL,   -- Cond NCD-SSB
            ssb-Index-r16    1405              SSB-Index
        },
        csi-RS-Index-r17     1406        NZP-CSI-RS-ResourceId
    }
}
```

FIG. 19

| PUCCH-PowerControl field descriptions |
|---|
| *pathlossReferenceRSs, pathlossReferenceRSs-v1610* |
| A set of Reference Signals (e.g. a CSI-RS config or a SS block) to be used for PUCCH pathloss estimation. Up to *maxNrofPUCCH-PathlossReference-RSs* may be configured. If the field is not configured, the UE uses the SSB as reference signal (see TS 38.213 [13], clause 7.2). The set includes References Signals indicated in pathlossReferenceRSs (without suffix) and in pathlossReferenceRSs-v1610. |
| *ssbFrequency* |
| Indicates the frequency of SSB, if SSB is used for the RS for PUCCH pathloss reference. |
| *ssbSubcarrierSpacing* |
| Indicates the sub-carrier spacing of SSB, if SSB is used for the RS for PUCCH pathloss reference. |
| *ssb-DL-BWP* |
| Indicates the DL BWP where SSB is transmitted, if SSB is used for the RS for PUCCH pathloss reference. |
| *ssb-Type* |
| Indicates the SSB type used for the RS for PUCCH pathloss reference. |

FIG. 20

*PUSCH-PowerControl information element*

```
PUSCH-PowerControl ::=                SEQUENCE { pathlossReferenceRSToAddModList       SEQUENCE (SIZE (1..maxNrofPUSCH-PathlossReferenceRSs)) OF PUSCH-PathlossReferenceRS
                                                                                                  OPTIONAL, -- Need N
    pathlossReferenceRSToReleaseList      SEQUENCE (SIZE (1..maxNrofPUSCH-PathlossReferenceRSs)) OF PUSCH-PathlossReferenceRS-Id
                                                                                                  OPTIONAL, -- Need N ...                                                                                           OPTIONAL  -- Need N
}

1501
PUSCH-PathlossReferenceRS-r17 ::=     SEQUENCE {
    pusch-PathlossReferenceRS-Id-r17      PUSCH-PathlossReferenceRS-Id-v1610,
    referenceSignal-r17           1502    CHOICE {
        ssb-r17                   1503    SEQUENCE {
            ssbFrequency-r17                  ARFCN-ValueNR
            ssbSubcarrierSpacing-r17          SubcarrierSpacing
            ssb-DL-BWP-r17        1504        BWP-Id
            ssb-Type-r17          1505        ENUMERATED {ncd-ssb, cd-ssb}
            ssb-Index-r16                     SSB-Index
        },                        1506
        csi-RS-Index-r17                  NZP-CSI-RS-ResourceId OPTIONAL,  -- Cond NCD-SSB
                                                                                                  OPTIONAL,  -- Cond NCD-SSB
                                                                                                  OPTIONAL,  -- Cond NCD-SSB
                                                                                                  OPTIONAL,  -- Cond NCD-SSB
    }
}

PUSCH-PathlossReferenceRS-Id ::=      INTEGER (0..maxNrofPUSCH-PathlossReferenceRSs-1)

PUSCH-PathlossReferenceRS-Id-v1610 ::= INTEGER (maxNrofPUSCH-PathlossReferenceRSs..maxNrofPUSCH-PathlossReferenceRSs-1-r16)

SRI-PUSCH-PowerControl ::=            SEQUENCE {
    sri-PUSCH-PowerControlId              SRI-PUSCH-PowerControlId,
    sri-PUSCH-PathlossReferenceRS-Id      PUSCH-PathlossReferenceRS-Id,
    sri-P0-PUSCH-AlphaSetId               P0-PUSCH-AlphaSetId,
    sri-PUSCH-ClosedLoopIndex             ENUMERATED { i0, i1 }
}

PUSCH-PowerControl-v1610 ::=          SEQUENCE {
    ...
    [[
    pathlossReferenceRSToAddModListSizeExt-v17xy   SEQUENCE (SIZE (1..maxNrofPUSCH-PathlossReferenceRSsDiff-r16)) OF PUSCH-
PathlossReferenceRS-r17
                                                                                                  OPTIONAL, -- Need N
    pathlossReferenceRSToReleaseListSizeExt-v17xy  SEQUENCE (SIZE (1..maxNrofPUSCH-PathlossReferenceRSsDiff-r16)) OF PUSCH-
PathlossReferenceRS-Id-v1610
                                                                                                  OPTIONAL  -- Need N
    ]]
}
```

FIG. 21

| PUSCH-PowerControl field descriptions |
|---|
| *pathlossReferenceRSToAddModList, pathlossReferenceRSToAddModListSizeExt* |
| A set of Reference Signals (e.g. a CSI-RS config or a SS block) to be used for PUSCH path loss estimation. The set consists of Reference Signals configured using *pathLossReferenceRSToAddModList* and Reference Signals configured using *pathlossReferenceRSToAddModListSizeExt.*Up to *maxNrofPUSCH-PathlossReferenceRSs* may be configured (see TS 38.213 [13], clause 7.1). |
| *pathlossReferenceRSToReleaseList, pathlossReferenceRSToReleaseListSizeExt* |
| Lists of reference symbols for PUSCH path loss estimation to be released by the UE. |
| *sri-PUSCH-MappingToAddModList* |
| A list of *SRI-PUSCH-PowerControl* elements among which one is selected by the SRI field in DCI (see TS 38.213 [13], clause 7.1). |
| *ssbFrequency* |
| Indicates the frequency of SSB, if SSB is used for the RS for PUSCH pathloss reference. |
| *ssbSubcarrierSpacing* |
| Indicates the sub-carrier spacing of SSB, if SSB is used for the RS for PUSCH pathloss reference. |
| *ssb-DL-BWP* |
| Indicates the DL BWP where SSB is transmitted, if SSB is used for the RS for PUSCH pathloss reference. |
| *ssb-Type* |
| Indicates the SSB type used for the RS for PUSCH pathloss reference. |

FIG. 25

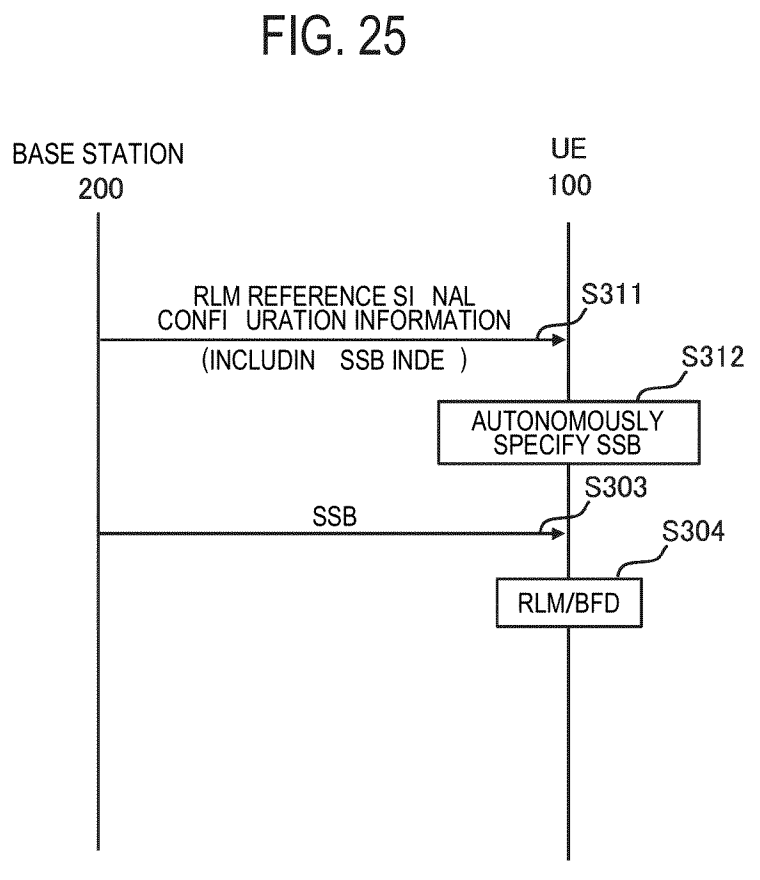

BASE STATION
200

UE
100

S311

RLM REFERENCE SIGNAL
CONFIGURATION INFORMATION
(INCLUDING SSB INDEX)

S312
AUTONOMOUSLY
SPECIFY SSB

SSB

S303

S304
RLM/BFD

FIG. 27

If a UE transmits a PUSCH on active UL BWP $b$ of carrier $f$ of serving cell $c$ using parameter set configuration with index $j$ and PUSCH power control adjustment state with index $l$, the UE determines the PUSCH transmission power $P_{\text{PUSCH},b,f,c}(i,j,q_d,l)$ in PUSCH transmission occasion $i$ as $$P_{\text{PUSCH},b,f,c}(i,j,q_d,l) = \min \left\{ \begin{array}{l} P_{\text{CMAX},f,c}(i), \\ P_{\text{O\_PUSCH},b,f,c}(j) + 10\log_{10}(2^{\mu} \cdot M_{\text{RB},b,f,c}^{\text{PUSCH}}(i)) + \alpha_{b,f,c}(j) \cdot PL_{b,f,c}(q_d) + \Delta_{\text{TF},b,f,c}(i) + f_{b,f,c}(i,l) \end{array} \right\}$$

[dBm]

FIG. 28

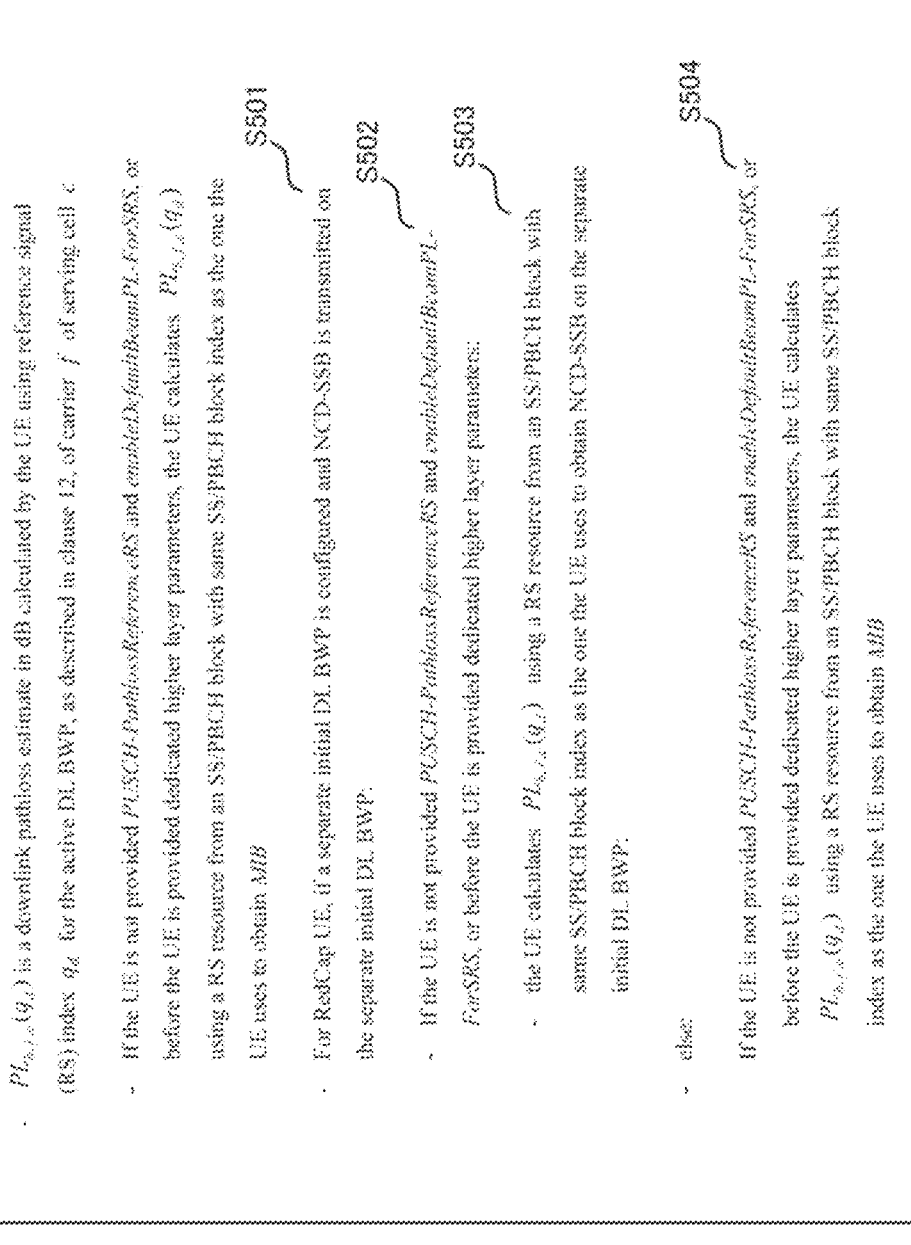

$PL_{b,f,c}(q_d)$ is a downlink pathloss estimate in dB calculated by the UE using reference signal (RS) index $q_d$ for the active DL BWP, as described in clause 12, of carrier $f$ of serving cell $c$.

- If the UE is not provided *PUSCH-PathlossReferenceRS* and *enableDefaultBeamPL-ForSRS*, or before the UE is provided dedicated higher layer parameters, the UE calculates $PL_{b,f,c}(q_d)$ using a RS resource from an SS/PBCH block with same SS/PBCH block index as the one the UE uses to obtain *MIB* — S501

- For RedCap UE, if a separate initial DL BWP is configured and NCD-SSB is transmitted on the separate initial DL BWP: — S502

- If the UE is not provided *PUSCH-PathlossReferenceRS* and *enableDefaultBeamPL-ForSRS*, or before the UE is provided dedicated higher layer parameters: — S503

- the UE calculates $PL_{b,f,c}(q_d)$ using a RS resource from an SS/PBCH block with same SS/PBCH block index as the one the UE uses to obtain NCD-SSB on the separate initial DL BWP.

- else:

If the UE is not provided *PUSCH-PathlossReferenceRS* and *enableDefaultBeamPL-ForSRS*, or before the UE is provided dedicated higher layer parameters, the UE calculates $PL_{b,f,c}(q_d)$ using a RS resource from an SS/PBCH block with same SS/PBCH block index as the one the UE uses to obtain *MIB* — S504

FIG. 29

If a UE transmits a PUCCH on active UL BWP $b$ of carrier $f$ in the primary cell $c$ using PUCCH power control adjustment state with index $l$, the UE determines the PUCCH transmission power $P_{PUCCH,b,f,c}(i,q_u,q_d,l)$ in PUCCH transmission occasion $i$ as $$P_{PUCCH,b,f,c}(i,q_u,q_d,l) = \min \begin{cases} P_{CMAX,f,c}(i), \\ P_{O\_PUCCH,b,f,c}(q_u) + 10\log_{10}(2^{\mu} \cdot M_{RB,b,f,c}^{PUCCH}(i)) + PL_{b,f,c}(q_d) + \Delta_{F\_PUCCH}(F) + \Delta_{TF,b,f,c}(i) + g_{b,f,c}(i,l) \end{cases}$$

$[dBm]$

FIG. 30

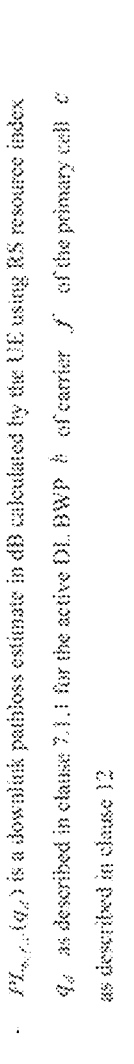

- $PL_{b,f,c}(q_d)$ is a downlink pathloss estimate in dB calculated by the UE using RS resource index $q_d$, as described in clause 7.1.1 for the active DL BWP $b$ of carrier $f$ of the primary cell $c$ as described in clause 12.

- If the UE is not provided *pathlossReferenceRSs* or before the UE is provided dedicated higher layer parameters, the UE calculates $PL_{b,f,c}(q_d)$ using a RS resource obtained from an SS/PBCH block with same SS/PBCH block index as the one the UE uses to obtain *MIB* —— S511

- For RedCap UE, if a separate initial DL BWP is configured and NCD-SSB is transmitted on the separate initial DL BWP: —— S512

- If the UE is not provided *pathlossReferenceRSs* or before the UE is provided dedicated higher layer parameters: —— S513

- the UE calculates $PL_{b,f,c}(q_d)$ using a RS resource from an SS/PBCH block with same SS/PBCH block index as the one the UE uses to obtain NCD-SSB on the separate initial DL BWP.

- else:

If the UE is not provided *pathlossReferenceRSs* or before the UE is provided dedicated higher layer parameters, the UE calculates $PL_{b,f,c}(q_d)$ using a RS resource from an SS/PBCH block with same SS/PBCH block index as the one the UE uses to obtain *MIB* —— S514

FIG. 31

If a UE transmits SRS based on a configuration by *SRS-ResourceSet* on active UL BWP $b$ of carrier $f$ of serving cell $c$ using SRS power control adjustment state with index $l$, the UE determines the SRS transmission power $P_{SRS,b,f,c}(i,q_s,l)$ in SRS transmission occasion $i$ as $$P_{SRS,b,f,c}(i,q_s,l) = \min \left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i,l) \end{array} \right\} \quad [\text{dBm}]$$

FIG. 32

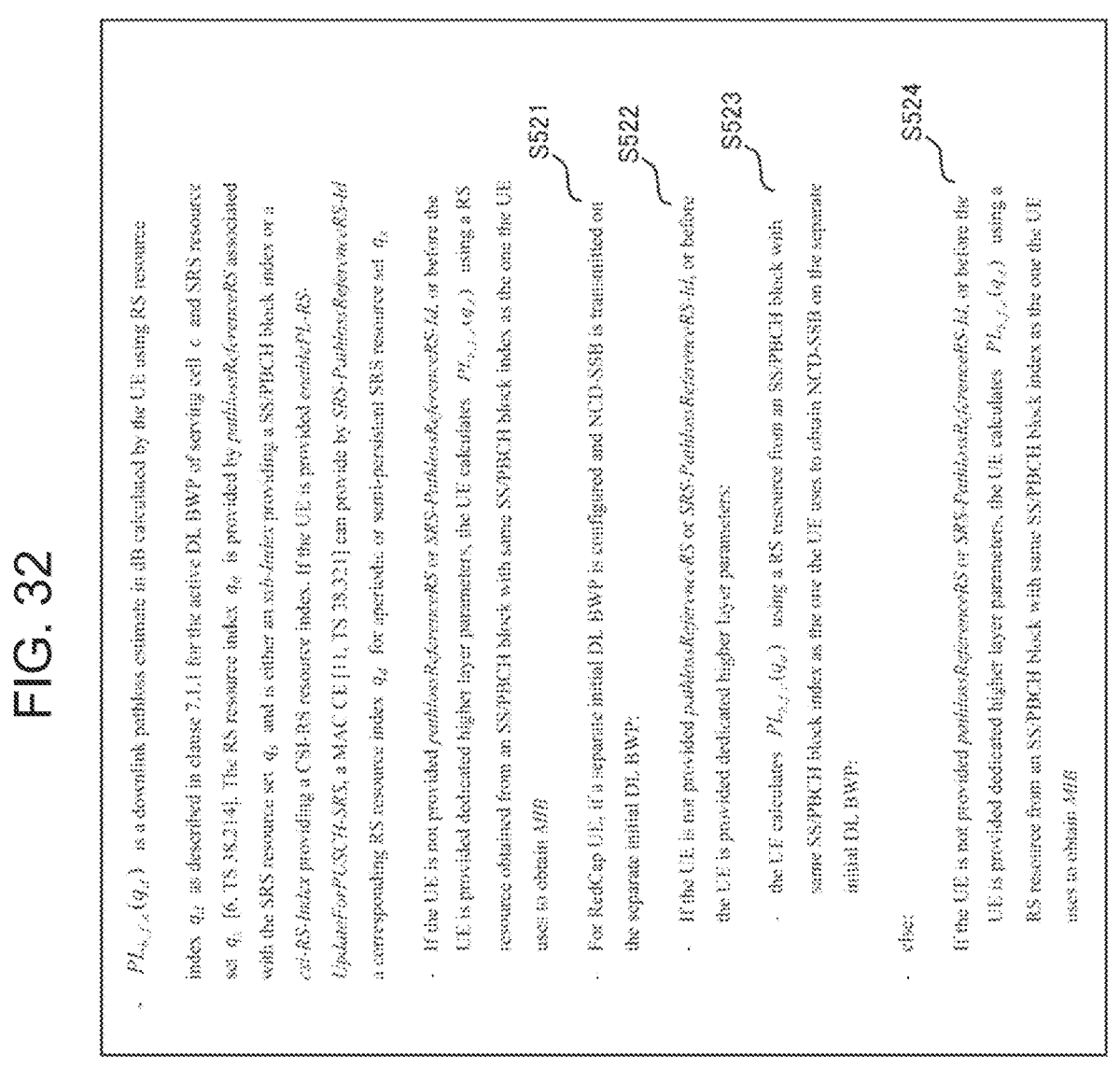

- $PL_{b,f,c}(q_d)$ is a downlink pathloss estimate in dB calculated by the UE using RS resource index $q_d$, as described in clause 7.1.1 for the active DL BWP of serving cell $c$ and SRS resource set $q_s$. [R, TS 38.214]. The RS resource index $q_d$ is provided by *pathlossReferenceRS* associated with the SRS resource set $q_s$ and is either an *ssb-Index* providing a SS/PBCH block index or a *csi-RS-Index* providing a CSI-RS resource index. If the UE is provided *enablePL-RS-UpdateForPUSCH-SRS*, a MAC CE [11, TS 38.321] can provide by *SRS-PathlossReferenceRS-Id* a corresponding RS resource index $q_d$ for aperiodic or semi-persistent SRS resource set $q_s$.

- If the UE is not provided *pathlossReferenceRS* or *SRS-PathlossReferenceRS-Id*, or before the UE is provided dedicated higher layer parameters, the UE calculates $PL_{b,f,c}(q_d)$ using a RS resource obtained from an SS/PBCH block with same SS/PBCH block index as the one the UE uses to obtain *MIB*.      S521

- For RedCap UE, if a separate initial DL BWP is configured and NCD-SSB is transmitted on the separate initial DL BWP:      S522

- If the UE is not provided *pathlossReferenceRS* or *SRS-PathlossReferenceRS-Id*, or before the UE is provided dedicated higher layer parameters:      S523

- the UE calculates $PL_{b,f,c}(q_d)$ using a RS resource from an SS/PBCH block with same SS/PBCH block index as the one the UE uses to obtain NCD-SSB on the separate initial DL BWP;

- else:      S524

If the UE is not provided *pathlossReferenceRS* or *SRS-PathlossReferenceRS-Id*, or before the UE is provided dedicated higher layer parameters, the UE calculates $PL_{b,f,c}(q_d)$ using a RS resource from an SS/PBCH block with same SS/PBCH block index as the one the UE uses to obtain *MIB*.

1

COMMUNICATION APPARATUS, BASE STATION, AND COMMUNICATION METHOD FOR NON-CELL DEFINING SSB

CROSS-REFERENCE TO RELATED APPLICATIONS

The present application is a continuation application of international Patent Application No. PCT/JP2022/040010, filed on Oct. 26, 2022, which designated the U.S., and claims the benefit of priority of Japanese Patent Application No. 2021-179813, filed on Nov. 2, 2021, the entire contents of which are incorporated herein by reference.

TECHNICAL FIELD

The present disclosure relates to a communication apparatus, a base station, and a communication method used in a mobile communication system.

BACKGROUND ART

In recent years, in the 3rd generation partnership project (3GPP) (registered trademark, the same applies hereinafter), which is a standardization project of a mobile communication system, it has been studied to provide a specific user equipment having a lower communication capability than that of general user equipment in the fifth generation (5G) system. The specific user equipment is a user equipment having middle range performance and price for Internet of Things (IoT), and for example, a maximum bandwidth used for radio communication is set narrower or the number of receivers is smaller as compared with the general user equipment. Such a specific user equipment is referred to as reduced capability user equipment (RedCap UE).

In addition, in the 5G system, a bandwidth part (BWP) is defined in order to reduce power consumption of the user equipment and effectively use a broadband carrier (see, for example, Non Patent Literature 1). The user equipment configured with the BWP does not need to support the same bandwidth as a bandwidth of a cell, and can perform communication in a frequency band narrower than the bandwidth of the cell. The BWP includes an initial BWP (an initial DL BWP and an initial UL BWP) and a dedicated BWP (a dedicated DL BWP and a dedicated UL BWP). Here, DL refers to downlink and UL refers to downlink. The initial BWP is at least a BWP used for initial access, and is commonly used for a plurality of user equipments. The dedicated BWP is a BWP configured to be dedicated to a certain user equipment (UE-specific BWP).

A base station transmits a synchronization signal block (synchronization signal/physical broadcast channel (PBCH) block (SSB)) in the initial BWP (initial DL BWP). The synchronization signal block may be referred to as a synchronization signal/physical broadcast channel block. An SSB associated with a system information block type 1 (SIB1) is referred to as a cell defining SSB (CD-SSB). From the perspective of one UE, one serving cell is associated with one CD-SSB. The SIB1 is also referred to as remaining minimum system information (RMSI). For example, the user equipment performs cell search and cell selection/reselection based on the received CD-SSB.

In the 3GPP, assuming the RedCap UE, it is agreed to configure an initial BWP for the RedCap UE independently of the conventional initial BWP. Such a newly introduced initial BWP is referred to as a separate initial BWP. In addition, it is proposed to configure SSB transmission in the separate initial DL BWP (see, for example, Non Patent Literatures 2 and 3).

Meanwhile, a spatial setting is configured from the base station to the user equipment for the purpose of beam control of a physical uplink control channel (PUCCH) for transmitting uplink control information (UCI) from the user equipment to the base station. Such a spatial setting includes a parameter for configuring a signal to be referred to in the beam control of the PUCCH, and an SSB index can be configured as the parameter (see, for example, Non Patent Literature 4). The user equipment configured with the SSB index as the spatial setting for the PUCCH transmission performs the PUCCH transmission using the same spatial domain filter as a spatial domain filter used for reception of an SSB indicated by the SSB index (see, for example, Non Patent Literature 5).

CITATION LIST

Non Patent Literature

Non Patent Literature 1: 3GPP technical specification "TS 38.300 V16.7.0"
Non Patent Literature 2: 3GPP Contribution "R1-2106563"
Non Patent Literature 3: 3GPP Contribution "R1-2106601"
Non Patent Literature 4: 3GPP technical specification "TS 38.331 V16.6.0"
Non Patent Literature 5: 3GPP technical specification "TS 38.213 V16.7.0"

SUMMARY OF INVENTION

A communication apparatus (100) according to a first feature includes: a receiver (112) configured to receive, from a base station (200), configuration information including a synchronization signal/physical broadcast channel block (SSB) index indicating an SSB to be referred to for performing at least one of operations of radio link monitoring (RLM) and beam failure detection (BFD); and a controller (120) configured to perform the at least one operation with reference to the SSB indicated by the SSB index. The controller (120) is configured to specify the SSB indicated by the SSB index as a non-cell-defining SSB (502) in a case where an absolute radio-frequency channel number indicating a frequency location at which the non-cell-defining SSB is transmitted is received.

A base station (200) according to a second feature includes: a transmitter (211) configured to transmit, to a communication apparatus (100), configuration information including a synchronization signal/physical broadcast channel block (SSB) index indicating an SSB to be referred to for performing at least one of operations of radio link monitoring (RLM) and beam failure detection (BFD). The transmitter (211) is configured to transmit, to the communication apparatus (100), an absolute radio-frequency channel number for specifying the SSB indicated by the SSB index as a non-cell-defining SSB (502), the absolute radio-frequency channel number indicating a frequency location at which the non-cell-defining SSB is transmitted.

A communication method according to a third feature is executed by a communication apparatus (100). The communication method includes the steps of: receiving, from a base station (200), configuration information including a synchronization signal/physical broadcast channel block (SSB) index indicating an SSB to be referred to for performing at least one of operations of radio link monitoring (RLM) and beam failure detection (BFD); and performing the at least one operation with reference to the SSB indicated by the SSB index. The performing of the at least one operation includes specifying the SSB indicated by the SSB index as a non-cell-defining SSB (502) in a case where an absolute radio-frequency channel number indicating a frequency location at which the non-cell-defining SSB is transmitted is received.

A communication method according to a fourth feature is executed by a base station (200). The communication method includes the steps of: transmitting, to a communication apparatus (100), configuration information including a synchronization signal/physical broadcast channel block (SSB) index indicating an SSB to be referred to for performing at least one of operations of radio link monitoring (RLM) and beam failure detection (BFD); and transmitting, to the communication apparatus (100), an absolute radio-frequency channel number for specifying the SSB indicated by the SSB index as a non-cell-defining SSB (502), the absolute radio-frequency channel number indicating a frequency location at which the non-cell-defining SSB is transmitted.

BRIEF DESCRIPTION OF DRAWINGS

Objects, features, advantages, and the like of the present disclosure will become more apparent from the following detailed description with reference to the accompanying drawings.

FIG. 3 is a diagram illustrating an example of radio resource control (RRC) parameters related to a synchronization signal/physical broadcast channel (PBCH) block (SSB).

FIG. 5 is a diagram illustrating a configuration of a user equipment (UE) according to an embodiment.

FIG. 6 is a diagram illustrating a configuration of a base station according to an embodiment.

FIG. 9 is a diagram illustrating an example of spatial relation configuration information (PUCCH-SpatialRelationInfo) according to the first embodiment.

FIG. 10 is a diagram illustrating an example of the spatial relation configuration information (PUCCH-SpatialRelationInfo) according to the first embodiment.

FIG. 12 is a diagram illustrating an example of the spatial relation configuration information (SRS-SpatialRelationInfo) according to the first embodiment.

FIG. 13 is a diagram illustrating an example of radio link monitoring (RLM)/beam failure detection (BFD) control according to the first embodiment.

FIG. 14 is a diagram illustrating an example of RLM reference signal configuration information (RadioLink-MonitoringRS) according to the first embodiment.

FIG. 15 is a diagram illustrating an example of the RLM reference signal configuration information (RadioLink-MonitoringRS) according to the first embodiment.

FIG. 16 is a diagram illustrating an example of the RLM reference signal configuration information (RadioLink-MonitoringRS) according to the first embodiment.

FIG. 18 is a diagram illustrating an example of pathloss reference signal configuration information according to the first embodiment.

FIG. 19 is a diagram illustrating an example of the pathloss reference signal configuration information according to the first embodiment.

FIG. 20 is a diagram illustrating an example of configuration information (PUSCH-PowerControl) for configuring a UE-specific parameter for transmission power control of a physical uplink shared channel (PUSCH) according to the first embodiment.

FIG. 21 is a diagram illustrating an example of the configuration information (PUSCH-PowerControl) for setting the UE-specific parameter for transmission power control of the PUSCH according to the first embodiment.

FIG. 25 is a diagram illustrating an example of RLM/BFD control according to the second embodiment.

FIG. 27 is a diagram illustrating an example of the UL transmission power in the UE according to the second embodiment.

FIG. 28 is a diagram illustrating an example of the UL transmission power in the UE according to the second embodiment.

FIG. 29 is a diagram illustrating an example of the UL transmission power in the UE according to the second embodiment.

FIG. 30 is a diagram illustrating an example of the UL transmission power in the UE according to the second embodiment.

FIG. 31 is a diagram illustrating an example of the UL transmission power in the UE according to the second embodiment.

FIG. 32 is a diagram illustrating an example of the UL transmission power in the UE according to the second embodiment.

DESCRIPTION OF EMBODIMENTS

Figure 1:
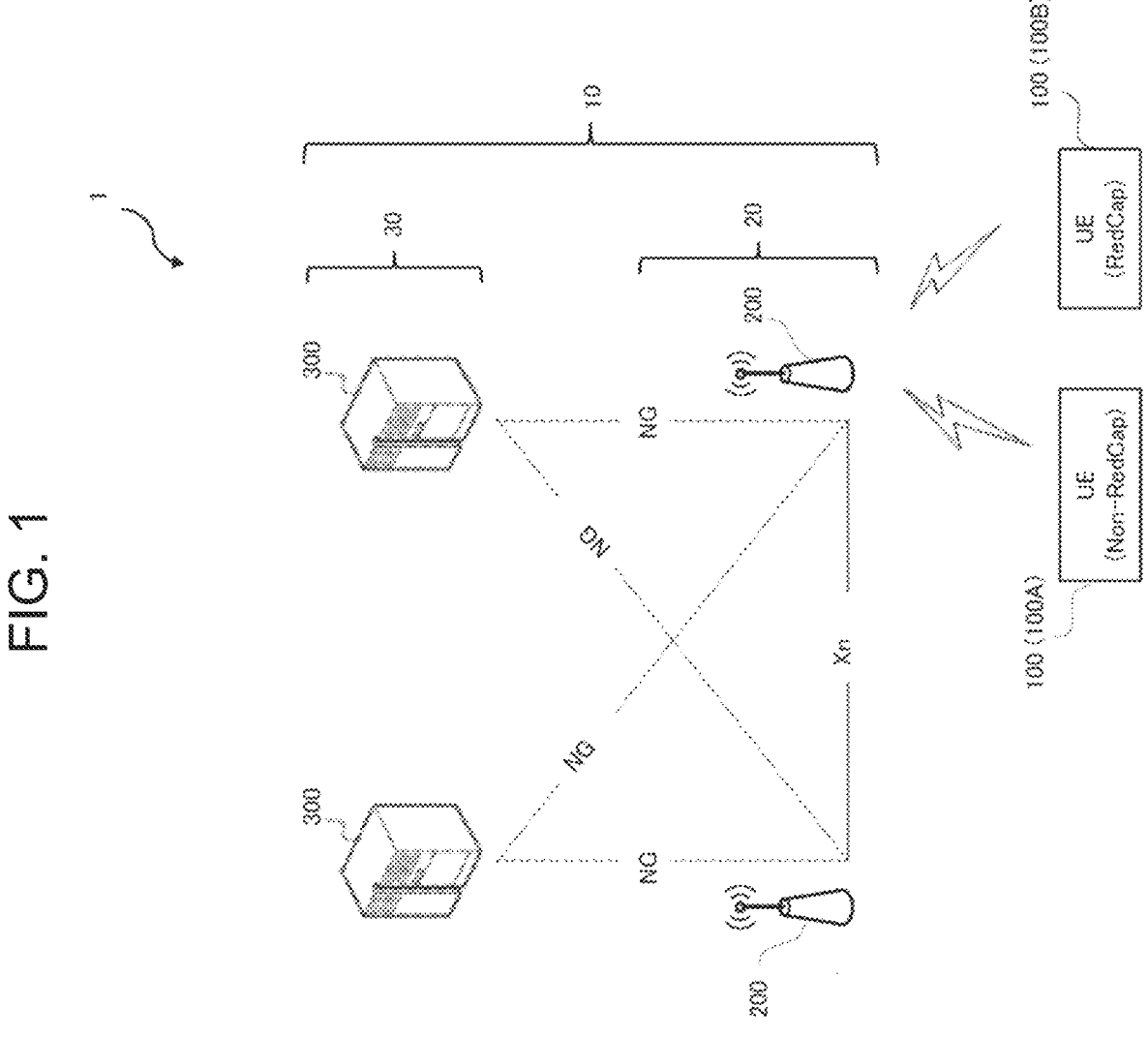
FIG. 1 is a diagram illustrating a configuration of a mobile communication system according to an embodiment.

One or more embodiments of a mobile communication system will now be described with reference to the accompanying figures. Like elements in the various figures are denoted by like reference numerals.

In a case where one cell of a base station is configured with a separate initial bandwidth part (BWP) in addition to a conventional initial BWP, it is conceivable that the base station transmits a cell defining synchronization signal/physical broadcast channel (PBCH) block (CD-SSB) in the conventional initial DL BWP and transmits a non-cell-defining SSB (Non-CD-SSB) in the separate initial DL BWP.

In an existing 3GPP technical specification, in a case where an SSB is used for beam control of a physical uplink control channel (PUCCH), an SSB index is configured for a user equipment on the assumption that there is only one SSB in a serving cell. There is no problem if only one SSB is transmitted in the serving cell. However, there is a problem that the user equipment cannot know which SSB should be used for the beam control of the PUCCH when the Non-CD-SSB is transmitted in the cell in addition to the CD-SSB.

Therefore, an object of the present disclosure is to provide a user equipment, a base station, and a communication method capable of appropriately controlling PUCCH transmission even in a case where a Non-CD-SSB is transmitted in a cell in addition to a CD-SSB.

First Embodiment (Configuration of Mobile Communication System)

A configuration of a mobile communication system 1 according to the embodiment will be described with reference to FIG. 1. The mobile communication system 1 is, for example, a system conforming to a technical specification (TS) of the 3rd generation partnership project (3GPP). Hereinafter, as the mobile communication system 1, a description will be given, as an example, as to the 5th generation system (5GS) of the 3GPP standard, that is, a mobile communication system based on new radio (NR).

The mobile communication system 1 includes a network 10 and a user equipment (UE) 100 that communicates with the network 10. The network 10 includes a next generation radio access network (NG-RAN) 20, which is a 5G radio access network, and a 5G core network (5GC) 30, which is a 5G core network.

The UE 100 is a communication apparatus that communicates with a base station 200. The UE 100 is an apparatus used by a user. The UE 100 is, for example, a mobile apparatus such as a mobile phone terminal such as a smartphone, a tablet terminal, a notebook personal computer (PC), a communication module, or a communication card. The UE 100 may be a vehicle (for example, a car or a train) or an apparatus provided in the vehicle. The UE 100 may be a transport body other than a vehicle (for example, a ship or an airplane) or an apparatus provided in the transport body. The UE 100 may be a sensor or an apparatus provided in the sensor. Note that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

In the present embodiment, as the UE 100 of NR, two types of UEs are assumed, that is, a general user equipment (Non-RedCap UE) 100A and a specific user equipment (RedCap UE) 100B having a lower communication capability than that of the general UE 100A. The general UE 100A has an advanced communication capability such as a high speed and high capacity (enhanced mobile broadband: eMBB) and ultra-reliable low delay (ultra-reliable and low latency communications: URLLC), which are characteristics of NR. Therefore, the general UE 100A has a higher communication capability than the specific UE 100B. The general UE 100A may be an existing UE, that is, a UE prior to Release 16 of the 3GPP technical specification (so-called legacy UE).

The specific UE 100B is a UE whose apparatus cost and complexity are reduced as compared with the general UE 100A. The specific UE 100B is a UE 100 having middle range performance and price for Internet of Things (IoT), and for example, a maximum bandwidth used for radio communication is set narrower or the number of receivers is smaller as compared with the general UE 100A. Note that the receiver may be referred to as a reception branch. The specific UE 100B may be referred to as a reduced capability NR device. Hereinafter, when the general UE 100A and the specific UE 100B are not distinguished, they are simply referred to as the UE 100.

The specific UE 100B may be able to communicate at a communication speed equal to or higher than a communication speed specified in a low power wide area (LPWA) standard, for example, long term evolution (LTE) Cat.1/1 bis, LTE Cat.M1 (LTE-M), or LTE Cat.NB1 (NB-IoT). The specific UE 100B may be capable of communicating with a bandwidth equal to or larger than a bandwidth defined by the LPWA standard. The specific UE 100B may support a limited bandwidth used for communication as compared with a UE of Release 15 or Release 16 of the 3GPP technical specification. For example, regarding a frequency range 1 (FR1), the maximum bandwidth (also referred to as a UE maximum bandwidth) supported by the specific UE 100B may be 20 MHz. In addition, regarding a frequency range 2 (FR2), the maximum bandwidth supported by the specific UE 100B may be 100 MHz. The specific UE 100B may have only one receiver that receives a radio signal. The specific UE 100B may be, for example, a wearable apparatus, a sensor apparatus, or the like.

The NG-RAN 20 includes a plurality of base stations 200. Each of the base stations 200 manages at least one cell. A cell forms a minimum unit of a communication area. For example, one cell belongs to one frequency (a carrier frequency) and is formed by one component carrier. The term "cell" may represent a radio communication resource, and may also represent a communication target of the UE 100. Each base station 200 can perform radio communication with the UE 100 existing in its own cell. The base station 200 communicates with the UE 100 by using a protocol stack of the RAN. The base station 200 provides NR user plane and control plane protocol terminations towards the UE 100 and is connected to the 5GC 30 via an NG interface. Such an NR base station 200 may be referred to as a gNodeB (gNB).

The 5GC 30 includes a core network apparatus 300. The core network apparatus 300 includes, for example, an access and mobility management function (AMF) and/or a user plane function (UPF). The AMF performs mobility management of the UE 100. The UPF provides a function specialized for user plane processing. The AMF and the UPF are connected to the base station 200 via the NG interface.

Figure 2:
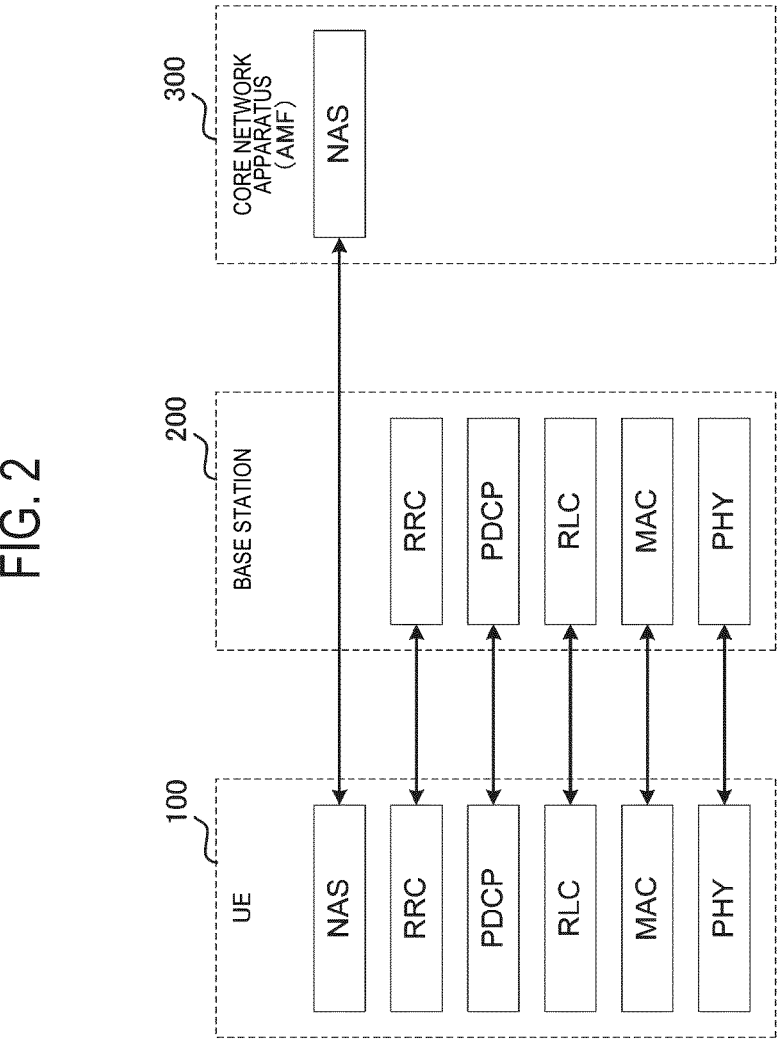
FIG. 2 is a diagram illustrating a configuration example of a protocol stack in the mobile communication system according to an embodiment.

Next, a configuration example of a protocol stack in the mobile communication system 1 according to one or more embodiments will be described with reference to FIG. 2.

A protocol of a radio section between the UE 100 and the base station 200 includes a physical (PHY) layer, a medium access control (MAC) layer, a radio link control (RLC)

layer, a packet data convergence protocol (PDCP) layer, and a radio resource control (RRC) layer.

The PHY layer performs encoding and decoding, modulation and demodulation, antenna mapping and demapping, and resource mapping and demapping. Data and control information are transmitted between the PHY layer of the UE 100 and the PHY layer of the base station 200 via a physical channel.

The physical channel includes a plurality of orthogonal frequency division multiplexing (OFDM) symbols in the time domain and a plurality of subcarriers in the frequency domain. One subframe includes a plurality of OFDM symbols in the time domain. A resource block (RB) is a resource allocation unit, and includes a plurality of OFDM symbols and a plurality of subcarriers. Specifically, in the 5G system, downlink transmission and uplink transmission are configured in a radio frame of 10 ms duration.

For example, the radio frame includes 10 subframes. For example, one subframe may be 1 ms. Furthermore, one subframe may include one or more slots. For example, the number of symbols forming one slot is normally 14 for a cyclic prefix (CP) and 12 for an extended CP. In addition, the number of slots forming one subframe changes according to the configured subcarrier spacing. For example, for the normal CP, when 15 kHz is configured as the subcarrier spacing, the number of slots per subframe is 1 (that is, 14 symbols), when 30 kHz is configured as the subcarrier spacing, the number of slots per subframe is 2 (that is, 28 symbols), when 60 kHz is configured as the subcarrier spacing, the number of slots per subframe is 4 (that is, 56 symbols), and when 120 kHz is configured as the subcarrier spacing, the number of slots per subframe is 8 (that is, 128 symbols). In addition, for the extended CP, when 60 kHz is configured as the subcarrier spacing, the number of slots per subframe is 4 (that is, 48 symbols).

Among the physical channels, a physical downlink control channel (PDCCH) plays a central role for purposes such as, for example, downlink scheduling allocation, uplink scheduling grant, and transmission power control. For example, the UE 100 performs blind decoding of the PDCCH using a cell-radio network temporary identifier (C-RNTI) and a modulation and coding scheme-C-RNTI (MCS-C-RNTI) or a configured scheduling-RNTI (CS-RNTI) allocated from the base station 200 to the UE 100, and acquires a downlink control information (DCI) which has been successfully decoded as a DCI addressed to its own UE. Here, a cyclic redundancy check (CRC) parity bit scrambled by the C-RNTI and the MCS-C-RNTI or the CS-RNTI is added to the DCI transmitted from the base station 200.

The UE 100 can use a bandwidth narrower than a system bandwidth (that is, the bandwidth of the cell). The base station 200 configures a bandwidth part (BWP) of consecutive PRBs for the UE 100. The UE 100 transmits and receives data and a control signal in an active BWP. The BWPs may have different subcarrier spacings or may have frequencies overlapping each other. In a case where a plurality of BWPs are configured for the UE 100, the base station 200 can designate which BWP is to be activated by control in downlink. As a result, the base station 200 can dynamically adjust a UE bandwidth according to the amount of data traffic of the UE 100 and the like, and can reduce UE power consumption.

The base station 200 may configure, for example, a maximum of three control resource sets (CORESETs) for each of a maximum of four BWPs on a serving cell. The CORESET is a radio resource for control information to be received by the UE 100. A maximum of 12 CORESETs may be configured on the serving cell for the UE 100. Each CORESET has an index of 0 to 11. For example, the CORESET includes six resource blocks (PRB) and one, two, or three consecutive OFDM symbols in the time domain.

The MAC layer performs priority control of data, retransmission processing by a hybrid automatic repeat request (HARQ: Hybrid Automatic Repeat reQuest), a random access procedure, and the like. Data and control information are transmitted between the MAC layer of the UE 100 and the MAC layer of the base station 200 via a transport channel. The MAC layer of the base station 200 includes a scheduler. The scheduler determines uplink and downlink transport formats (transport block size and modulation and coding scheme (MCS)) and resources to be allocated to the UE 100.

The RLC layer transmits data to the RLC layer on a reception side using the functions of the MAC layer and the PHY layer. Data and control information are transmitted between the RLC layer of the UE 100 and the RLC layer of the base station 200 via a logical channel.

The PDCP layer performs header compression and decompression and encryption and decryption.

A service data adaptation protocol (SDAP) layer may be provided as an upper layer of the PDCP layer. The service data adaptation protocol (SDAP) layer performs mapping between an IP flow that is a unit in which a core network performs quality of service (QoS) control, and a radio bearer that is a unit in which an access stratum (AS) performs QoS control.

The RRC layer controls the logical channel, the transport channel, and the physical channel according to establishment, reestablishment, and release of the radio bearer. RRC signaling for various configurations is transmitted between the RRC layer of the UE 100 and the RRC layer of the base station 200. In a case where there is an RRC connection between the RRC of the UE 100 and the RRC of the base station 200, the UE 100 is in an RRC connected state. In a case where there is no RRC connection between the RRC of the UE 100 and the RRC of the base station 200, the UE 100 is in an RRC idle state. In a case where an RRC connection between the RRC of the UE 100 and the RRC of the base station 200 is suspended, the UE 100 is in an RRC inactive state.

A non-access stratum (NAS) layer located above the RRC layer performs session management and mobility management of the UE 100. NAS signaling is transmitted between the NAS layer of the UE 100 and the NAS layer of the core network apparatus 300 (AMF). Note that the UE 100 has an application layer and the like in addition to a protocol of a radio interface.

(BWP)

A BWP is defined for reducing power consumption of the UE 100 and effectively using a broadband carrier. The BWP includes an initial BWP (an initial DL BWP and an initial UL BWP) and a dedicated BWP (a dedicated DL BWP and a dedicated UL BWP). Up to four DL BWPs and up to four UL BWPs are configured in one serving cell for the UE 100 according to the capability. In the following description, when the DL BWP and the UL BWP are not distinguished, they are simply referred to as the BWP.

The initial BWP is at least a BWP used for initial access, and is commonly used by a plurality of UEs 100. bwp-id, which is a BWP identifier, is defined as "0" for each of the initial DL BWP and the initial UL BWP. There are two types of initial BWPs: an initial BWP derived and configured by a master information block (MIB) transmitted on a PBCH;

and an initial BWP configured by a system information block (SIB), specifically, a system information block type 1 (SIB1). The initial BWP configured by the MIB has a bandwidth corresponding to CORESET #0 configured using parameters included in the MIB. The initial BWP configured by the SIB1 is configured by various parameters (locationAndBandwidth, subcarrierSpacing, and cyclicPrefix) included in ServingCellConfigCommonSIB which is an information element in the SIB1.

Upon initial access to a cell, the UE 100 that has received an SSB of the cell acquires a bandwidth (24, 48, or 96 RBs) of a Type-0 PDCCH CSS set from a setting value of controlResourceSetZero (an integer value from 0 to 15) in pdcch-ConfigSIB1 which is an information element included in the PBCH (MIB). Then, the UE 100 monitors the Type-0 PDCCH CSS set to acquire the SIB1, and acquires locationAndBandwidth, which is a parameter indicating a frequency location and/or bandwidth of the initial BWP, from the SIB1. The UE 100 uses the initial BWP configured by the MIB, that is, the bandwidth based on CORESET #0, as the initial BWP until a message 4 (Msg. 4) during a random access procedure in the initial access is received. On the other hand, after the Msg.4 is received, the UE 100 uses the bandwidth configured by locationAndBandwidth in the SIB1 as the initial BWP. Note that Msg.4 may be an RRCSetup message, an RRCResume message, or an RRCReestablishment message. The UE 100 transitions from, for example, an RRC idle state to an RRC connected state by such initial access (random access procedure).

The dedicated BWP is a BWP configured to be dedicated to a certain UE 100 (UE-specific BWP). bwp-id other than "0" may be configured for the dedicated BWP. For example, the dedicated DL BWP and the dedicated UL BWP are configured based on BWP-Downlink and BWP-Uplink which are information elements included in SevingcellConfig in an RRC message which is dedicated signaling transmitted from the base station 200 to the UE 100. For example, each of BWP-Downlink and BWP-Uplink may include various parameters (locationAndBandwidth, subcarrierSpacing, and cyclicPrefix) for configuring the BWP.

The base station 200 can notify the UE 100 of a BWP (that is, an active BWP) used for communication with the base station 200 among the one or more configured BWPs. Specifically, the base station 200 can transmit, to the UE 100, a BWP identifier indicating a BWP to be activated at the time of performing the configuration, that is, a BWP to be first used in communication with the base station 200. Furthermore, for example, switching by a PDCCH (DCI), RRC signaling, an MAC control element (MAC CE), or a timer is used for control of switching from an active BWP to a BWP that is not an active BWP (hereinafter, referred to as an inactive BWP) and switching from an inactive BWP to an active BWP.

Note that the communication in the active BWP may include at least one of transmission on an uplink-shared channel (UL-SCH) in the BWP, transmission on a random access channel (RACH) in the BWP (when a physical random access channel (Physical RACH: PRACH) occasion is configured), monitoring of a physical downlink control channel (PDCCH) in the BWP, transmission on a physical uplink control channel (PUCCH) in the BWP (when a PUCCH resource is configured), a report of channel state information (CSI) for the BWP, and reception of a downlink-shared channel (DL-SCH) in the BWP.

Here, the UL-SCH is a transport channel and is mapped to a physical uplink shared channel (PUSCH) which is a physical channel. Data transmitted on the UL-SCH is also referred to as UL-SCH data. For example, the data may correspond to UL-SCH data and uplink user data. Further, the DL-SCH is a transport channel and is mapped to a physical downlink shared channel (PDSCH) which is a physical channel. Data transmitted on the DL-SCH is also referred to as DL-SCH data. For example, the data may correspond to DL-SCH data and downlink user data.

The PUCCH is used to transmit uplink control information (UCI). For example, the uplink control information includes a hybrid automatic repeat request (HARQ-ACK), CSI, and/or a scheduling request (SR). The HARQ-ACK includes a positive acknowledgment or a negative acknowledgment. For example, the PUCCH is used to transmit the HARQ-ACK for the PDSCH (that is, the DL-SCH (DL-SCH data and downlink user data)). Here, the DL-SCH data and/or the downlink user data are also referred to as a downlink transport block.

For example, the UE 100 monitors a set of PDCCH candidates in one or a plurality of control resource set(s) (CORESET(s)) in an active DL BWP. Monitoring of the PDCCH may include decoding each of the PDCCH candidates according to a monitored downlink control information (DCI) format. Here, the UE 100 may monitor a DCI format to which a cyclic redundancy check (also referred to as a CRC parity bit) scrambled by a radio network temporary identifier (RNTI) configured by the base station 200 is added. Here, the RNTI may include a System Information-RNTI (SI-RNTI), a Random Access RNTI (RA-RNTI), a Temporary C-RNTI (TC-RNTI), a Paging RNTI (P-RNTI), and/or a Cell-RNTI (C-RNTI). The set of PDCCH candidates monitored by the UE 100 may be defined as a PDCCH search space set. The search space set may include a common search space set(s) (CSS set(s)) and/or a UE specific search space set(s) (USS set(s)). Therefore, the base station 200 may set the CORESET and/or the search space set for the UE 100, and the UE 100 may monitor the PDCCH in the set CORESET and/or the search space set.

(SSB)

The base station 200 transmits the SSB in the initial DL BWP. For example, the SSB includes four consecutive OFDM symbols, and a primary synchronization signal (PSS), a secondary synchronization signal (SSS), a PBCH (MIB), and a demodulation reference signal (DMRS) of the PBCH are arranged. A location of a resource element (time resource/frequency resource) to which the SSB is mapped is specified in the 3GPP technical specification, for example, "section 7.4.3.1" of "TS 38.211 v16.2.0" and "section 4.1" of "TS 38.213 v16.2.0". A bandwidth of the SSB is, for example, a bandwidth of 240 consecutive subcarriers, that is, 20 RBs.

The SSB associated with the SIB1 is referred to as a cell-defining SSB (CD-SSB). From the viewpoint of one UE 100, one serving cell is associated with one CD-SSB. Note that the SIB1 is also referred to as remaining minimum system information (RMSI). One CD-SSB corresponds to one cell having a unique NR cell global identifier (NCGI). The SSB that is not associated with the SIB1 (RMSI) is referred to as a non-cell-defining SSB (Non-CD-SSB).

As illustrated in FIG. 3, the base station 200 notifies the UE 100 of the SSB being transmitted, for example, by parameters (ssb-PositionsInBurst and ssb-periodicityServingCell) included in ServingCellConfigCommonSIB which is an information element in the SIB1. ssb-PositionsInBurst indicates a time position of the SSB being transmitted in an SS burst of a half frame (5 ms). ssb-periodicityServingCell indicates a transmission period of the SSB.

The UE 100 can grasp an SSB index of the SSB being transmitted based on ssb-PositionsInBurst. Specifically, the maximum quantity (up to 64) of SSBs in the half frame is determined according to the subcarrier spacing and the frequency band, and the UE 100 can determine a location candidate for the SSB in the time domain based on the SSB index. The UE 100 grasps whether or not the SSB is actually being transmitted at the location candidate based on ssb-PositionsInBurst. However, the SSB index is not associated with the frequency location in which the corresponding SSB is transmitted. Therefore, in a case where a plurality of SSBs are transmitted in one cell, the UE 100 cannot grasp the frequency location based on the SSB index.

(Separate Initial BWP)

In the 3GPP, assuming the specific UE 100B (RedCap UE), it is agreed to configure an initial BWP (second initial BWP) for the specific UE 100B (RedCap UE) independently of the conventional initial BWP. Such a newly introduced initial BWP is referred to as a separate initial BWP. The conventional initial BWP is a first initial BWP assuming the general UE 100 (Non-RedCap UE). The separate initial BWP is the second initial BWP different from the first initial BWP.

A bandwidth of the separate initial BWP may be equal to or less than the maximum bandwidth of the specific UE 100B (RedCap UE). A frequency band of the separate initial BWP may be configured in such a way as not to overlap a frequency band of the conventional initial BWP to prevent UL transmission of the general UE 100 (Non-RedCap UE) from being adversely affected.

For example, the base station 200 transmits a parameter (for example, locationAndBandwidth) indicating the frequency location and/or bandwidth for each of the separate initial DL BWP and/or the separate initial UL BWP by the SIB1. Note that the parameters such as the subcarrier spacing and the cyclic prefix (for example, subcarrierSpacing and cyclicPrefix) for each of the separate initial DL BWP and/or the separate initial UL BWP may be configured or do not have to be configured. CORESET #0 does not have to be configured for the separate initial DL BWP. Further, the SIB1 does not have to be transmitted in the separate initial DL BWP.

Figure 4:
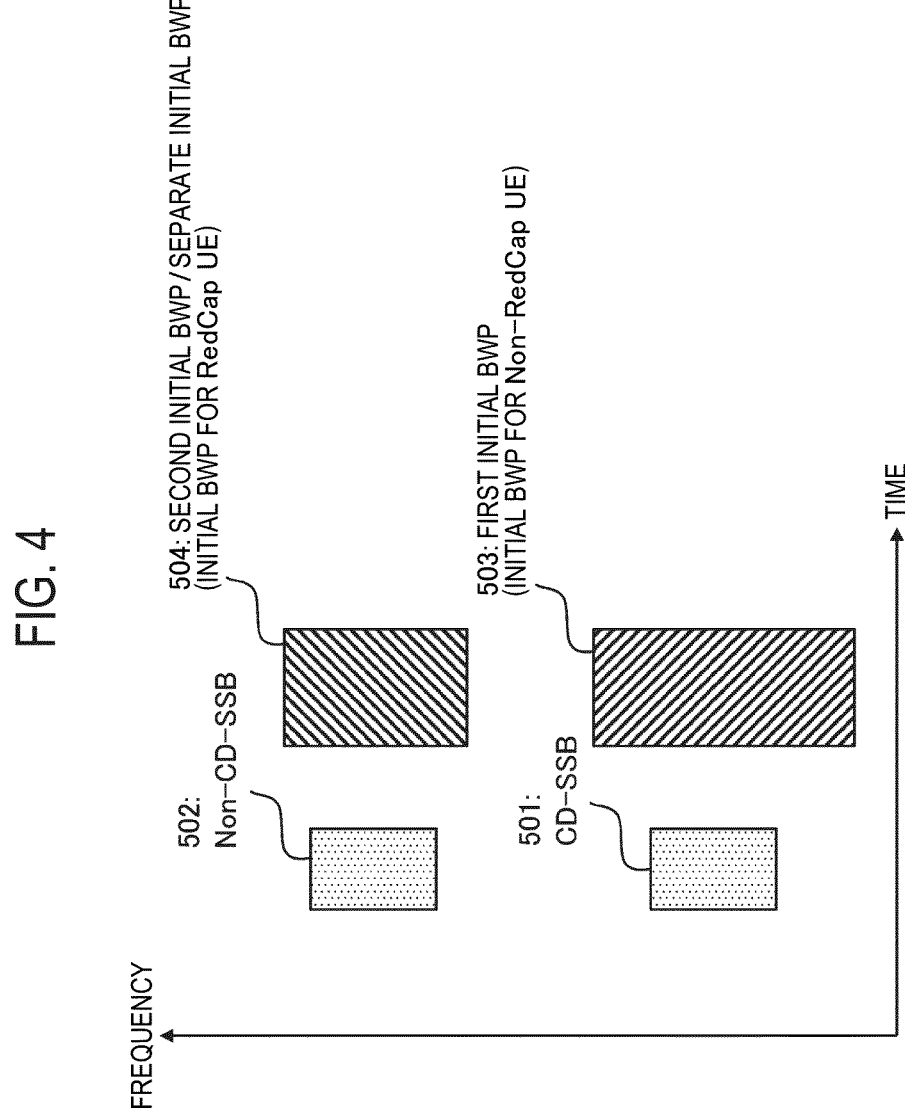
FIG. 4 is a diagram illustrating an example of a relationship between an SSB and an initial bandwidth part (BWP) according to an embodiment.

In the embodiment, it is assumed that the SSB is transmitted in the separate initial DL BWP. FIG. 4 illustrates an example of a relationship between the SSB and the initial BWP.

In the example illustrated in FIG. 4, the base station 200 (cell) transmits a CD-SSB 501 in a frequency band of a first initial BWP 503 and transmits a Non-CD-SSB 502 in a frequency band of a second initial BWP 504. The second initial BWP 504 is arranged apart from the first initial BWP 503 in the frequency domain. Since the Non-CD-SSB 502 is transmitted in the second initial BWP 504, the specific UE 100B (RedCap UE) can efficiently control communication in the second initial BWP 504 located at the same frequency location based on the Non-CD-SSB 502.

For example, it is assumed that the specific UE 100B uses a measurement result for the CD-SSB 501 in initial access with the second initial BWP 504. In this case, since the frequency band is different between the CD-SSB 501 and the second initial BWP 504, there is a concern that the measurement result does not align with the actual radio quality of the second initial BWP 504. On the other hand, in a case where the specific UE 100B performs initial access with the second initial BWP 504 based on the measurement result for the Non-CD-SSB 502, the frequency band of the Non-CD-SSB 502 and the frequency band of the second initial BWP

504 are the same as each other, so that the correct measurement result can be used. In addition, the specific UE 100B does not need to perform frequency switching (retuning) between the frequency band of the first initial BWP 503 and the frequency band of the second initial BWP 504.

As described above, in the embodiment, the base station 200 (cell) transmits the CD-SSB 501 in the first initial BWP 503 which is the conventional initial DL BWP, and transmits the Non-CD-SSB 502 in the second initial BWP 504 which is the separate initial DL BWP.

Meanwhile, for the UE 100, a spatial setting is configured from the base station 200 for the purpose of the beam control of the PUCCH. Such a spatial setting includes a parameter for configuring a signal to be referred to in the beam control of the PUCCH, and an SSB index can be configured as the parameter. The UE 100 configured with the SSB index as the spatial setting for PUCCH transmission performs the PUCCH transmission using the same spatial domain filter as a spatial domain filter used for reception of an SSB indicated by the SSB index.

Furthermore, a spatial setting is configured from the base station 200 for the UE 100 for the purpose of beam control of a sounding reference signal (SRS) transmitted from the UE 100 to the base station 200. Such a spatial setting includes a parameter for configuring a signal to be referred to in the beam control of the SRS, and an SSB index can be configured as the parameter. The UE 100 configured with the SSB index as the spatial setting for SRS transmission performs the SRS transmission using the same spatial domain filter as a spatial domain filter used for reception of an SSB indicated by the SSB index.

In addition, the UE 100 performs at least one of radio link monitoring (RLM) or beam failure detection (BFD) based on a reference signal received from the base station 200. The base station 200 transmits, to the UE 100, RLM reference signal configuration information for configuring the reference signal used for at least one of the RLM or the BFD (hereinafter, abbreviated as "RLM/BFD" as appropriate). Such configuration information includes a parameter for configuring a signal to be referred to in the RLM/BFD, and an SSB index can be configured as the parameter.

In addition, the UE 100 performs pathloss estimation for uplink transmission power control based on a reference signal received from the base station 200. The base station 200 transmits pathloss reference signal configuration information for configuring the reference signal used for the pathloss estimation to the UE 100. Such configuration information includes a parameter for configured a signal to be referred to in the pathloss estimation, and an SSB index can be configured as the parameter. The UE 100 configured with such an SSB index performs the pathloss estimation (pathloss calculation) by using an SSB indicated by the SSB index.

In the existing 3GPP technical specification, in a case where an SSB is used for the beam control of the PUCCH and/or SRS, the SSB index is configured for the UE 100 on the assumption that there is only one SSB in a serving cell. There is no problem if only one SSB is transmitted in the serving cell. However, the UE 100 cannot know which SSB should be used for the beam control of the PUCCH and/or SRS when the Non-CD-SSB 502 is transmitted in the cell in addition to the CD-SSB 501.

Similarly, in the existing 3GPP technical specification, in a case where an SSB is used for the RLM/BFD, an SSB index is configured for the UE 100 on the assumption that there is only one SSB in a serving cell. However, in a case where the Non-CD-SSB 502 is transmitted in the cell in addition to the CD-SSB 501, the UE 100 cannot know which SSB should be used for the RLM/BFD.

Similarly, in the existing 3GPP technical specification, in a case where an SSB is used for the pathloss estimation for uplink transmission power control, an SSB index is configured for the UE 100 on the assumption that there is only one SSB in a serving cell. However, in a case where the Non-CD-SSB 502 is transmitted in the cell in addition to the CD-SSB 501, the UE 100 cannot know which SSB should be used for the pathloss estimation.

(Configuration of User Equipment)

Figure 5:
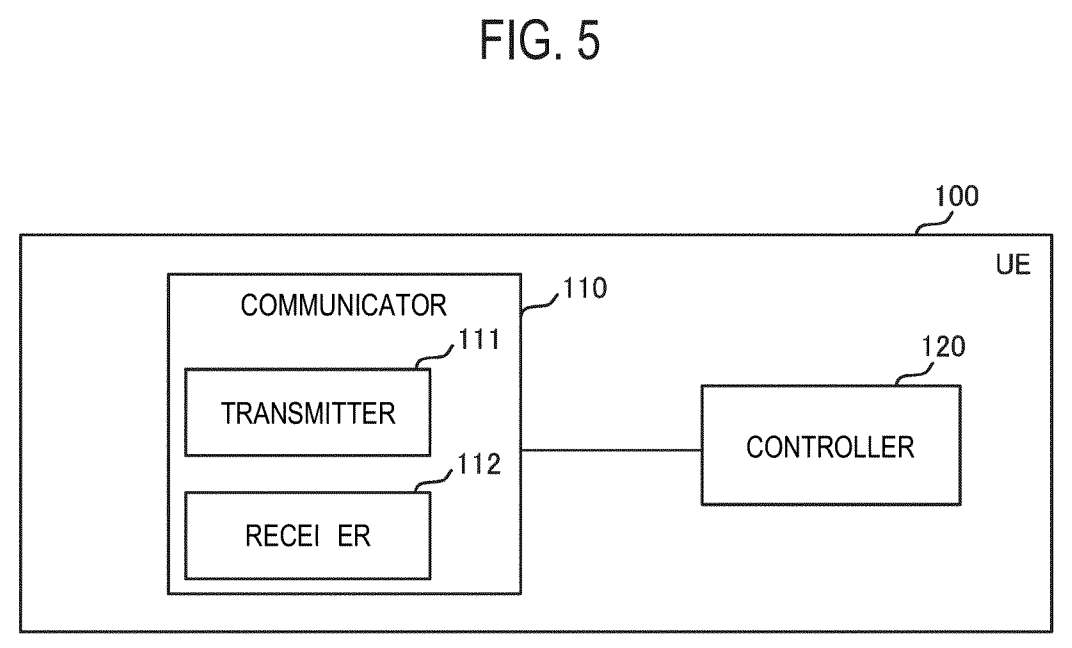

A configuration of the UE 100 according to the embodiment will be described with reference to FIG. 5. The UE 100 may be the general UE 100A or the specific UE 100B. The UE 100 includes a communicator 110 and a controller 120.

The communicator 110 performs radio communication with the base station 200 by transmitting and receiving a radio signal to and from the base station 200. The communicator 110 includes at least one transmitter 111 and at least one receiver 112. The transmitter 111 and the receiver 112 may include a plurality of antennas and a radio frequency (RF) circuit. The antenna converts a signal into a radio wave and emits the radio wave into space. Furthermore, the antenna receives a radio wave in space and converts the radio wave into a signal. The RF circuit performs analog processing of a signal transmitted and received via the antenna. The RF circuit may include a high frequency filter, an amplifier, a modulator, a low pass filter, and the like.

The controller 120 performs various types of control in the UE 100. The controller 120 controls communication with the base station 200 via the communicator 110. The operation of the UE 100 described above and described later may be an operation under the control of the controller 120. The controller 120 may include at least one processor capable of executing a program and a memory that stores the program. The processor may execute the program to perform the operation of the controller 120. The controller 120 may include a digital signal processor that executes digital processing of a signal transmitted and received via the antenna and the RF circuit. The digital processing includes processing of the protocol stack of the RAN. The memory stores the program executed by the processor, a parameter related to the program, and data related to the program. The memory may include at least one of a read only memory (ROM), an erasable programmable read only memory (EPROM), an electrically erasable programmable read only memory (EEPROM), a random access memory (RAM), or a flash memory. All or part of the memory may be included in the processor.

The UE 100 configured in this manner receives an SSB transmitted in an initial BWP that is a part of a bandwidth of a cell (serving cell) of the base station 200. In the UE 100 according to the first embodiment, the transmitter 111 performs PUCCH transmission to the base station 200. The receiver 112 receives, from the base station 200, configuration information including an SSB index indicating the SSB to be referred to for controlling the PUCCH transmission. The controller 120 controls the PUCCH transmission with reference to the SSB indicated by the SSB index included in the received configuration information. In the first embodiment, the receiver 112 receives configuration information further including identification information for specifying whether the SSB indicated by the SSB index is the CD-SSB 501 or the Non-CD-SSB 502. As a result, the UE 100 can specify whether the SSB indicated by the configured SSB index is the CD-SSB 501 or the Non-CD-SSB 502 based on the identification information. Therefore, even in a case where the Non-CD-SSB 502 is transmitted in the cell (serving cell) in addition to the CD-SSB 501, the PUCCH transmission can be appropriately controlled.

Such configuration information may be spatial relation configuration information for configuring a spatial setting related to beam control for the PUCCH transmission. In a case where the SSB indicated by the SSB index is specified as the Non-CD-SSB 502, the controller 120 performs control to perform the PUCCH transmission using the same spatial domain filter as a spatial domain filter used for reception of the Non-CD-SSB 502. On the other hand, in a case where that the SSB indicated by the SSB index is specified as the CD-SSB 501, the controller 120 performs control to perform the PUCCH transmission using the same spatial domain filter as a spatial domain filter used for reception of the CD-SSB 501. Therefore, even in a case where the Non-CD-SSB 502 is transmitted in the cell (serving cell) in addition to the CD-SSB 501, it is possible to appropriately perform the beam control for the PUCCH transmission.

In the UE 100 according to the first embodiment, the transmitter 111 performs SRS transmission to the base station 200. The receiver 112 receives, from the base station 200, configuration information including an SSB index indicating the SSB to be referred to for controlling the SRS transmission. The controller 120 controls the SRS transmission with reference to the SSB indicated by the SSB index included in the received configuration information. In the first embodiment, the receiver 112 receives configuration information further including identification information for specifying whether the SSB indicated by the SSB index is the CD-SSB 501 or the Non-CD-SSB 502. As a result, the UE 100 can specify whether the SSB indicated by the configured SSB index is the CD-SSB 501 or the Non-CD-SSB 502 based on the identification information. Therefore, even in a case where the Non-CD-SSB 502 is transmitted in the cell (serving cell) in addition to the CD-SSB 501, the SRS transmission can be appropriately controlled.

Note that the SRS transmission refers to an operation in which the base station 200 transmits an SRS, which is an uplink physical signal for channel estimation used for estimating an uplink channel state, to the base station 200, and the UE 100 performs the SRS transmission according to the configuration from the base station 200. That is, the SRS transmission is an operation for link adaptation of an uplink. The link adaptation adapts, to a channel state, a modulation and coding scheme (MCS) applied to data transmission.

Such configuration information may be spatial relation configuration information for configuring a spatial setting related to beam control for the SRS transmission. In a case where the SSB indicated by the SSB index is specified as the Non-CD-SSB 502, the controller 120 performs control to perform the SRS transmission using the same spatial domain filter as a spatial domain filter used for reception of the Non-CD-SSB 502. On the other hand, in a case where that the SSB indicated by the SSB index is specified as the CD-SSB 501, the controller 120 performs control to perform the SRS transmission using the same spatial domain filter as a spatial domain filter used for reception of the CD-SSB 501. Therefore, even in a case where the Non-CD-SSB 502 is transmitted in the cell (serving cell) in addition to the CD-SSB 501, it is possible to appropriately perform the beam control for the SRS transmission.

In addition, in the UE 100 according to the first embodiment, the receiver 112 receives configuration information including an SSB index indicating an SSB to be referred to for performing the RLM/BFD from the base station 200. The controller 120 performs the RLM/BFD with reference to the SSB indicated by the SSB index included in the received configuration information. In the first embodiment, the receiver 112 receives configuration information further including identification information for specifying whether the SSB indicated by the SSB index is the CD-SSB 501 or the Non-CD-SSB 502. As a result, the UE 100 can specify whether the SSB indicated by the configured SSB index is the CD-SSB 501 or the Non-CD-SSB 502 based on the identification information. Therefore, even in a case where the Non-CD-SSB 502 is transmitted in the cell (serving cell) in addition to the CD-SSB 501, the RLM/BFD can be appropriately controlled.

Note that the RLM/BFD includes, for example, processing of detecting a failure event (for example, out-of-synchronization) by monitoring a reception state of a reference signal in the PHY layer of the UE 100. The UE 100 counts failure event notifications from the PHY layer to an MAC layer with a counter, and detects a radio link failure or beam failure when the count value becomes equal to or larger than a specified number of times within a predetermined time. In a case where the SSB index is configured in the configuration information, the UE 100 performs the RLM/BFD by using the SSB.

Such configuration information may be RLM reference signal configuration information for configuring a reference signal used for at least one of the RLM or the BFD. In a case where the SSB indicated by the SSB index is specified as the Non-CD-SSB 502, the controller 120 performs the RLM/BFD using the Non-CD-SSB 502. On the other hand, in a case where the SSB indicated by the SSB index is specified as the CD-SSB 501, the controller 120 performs the RLM/BFD using the CD-SSB 501. Therefore, even in a case where the Non-CD-SSB 502 is transmitted in the cell (serving cell) in addition to the CD-SSB 501, the RLM/BFD can be appropriately controlled.

In addition, in the UE 100 according to the first embodiment, the receiver 112 receives, from the base station 200, configuration information including an SSB index indicating an SSB to be referred to for the pathloss estimation for the uplink (UL) transmission power control. The controller 120 performs the pathloss estimation with reference to the SSB indicated by the SSB index included in the configuration information. In the first embodiment, the receiver 112 receives configuration information further including identification information for specifying whether the SSB indicated by the SSB index is the CD-SSB 501 or the Non-CD-SSB 502. As a result, the UE 100 can specify whether the SSB indicated by the configured SSB index is the CD-SSB 501 or the Non-CD-SSB 502 based on the identification information. Therefore, even in a case where the Non-CD-SSB 502 is transmitted in the cell (serving cell) in addition to the CD-SSB 501, the pathloss estimation can be appropriately controlled.

Such configuration information may be pathloss reference signal configuration information for configuring a reference signal used for the pathloss estimation. In a case where the SSB indicated by the SSB index is specified as the Non-CD-SSB 502, the controller 120 performs the pathloss estimation using the Non-CD-SSB 502. On the other hand, in a case where the SSB indicated by the SSB index is specified as the CD-SSB 501, the controller 120 performs the pathloss estimation using the CD-SSB 501. Therefore, even in a case where the Non-CD-SSB 502 is transmitted in the cell (serving cell) in addition to the CD-SSB 501, the pathloss estimation can be appropriately controlled.

Here, the CD-SSB 501 may be an SSB transmitted in the first initial BWP 503 (that is, the conventional initial DL BWP) of the cell (serving cell). The Non-CD-SSB 502 may be an SSB transmitted in the second initial BWP 504 (that is, the separate initial DL BWP) different from the first initial BWP 503 in the cell (serving cell). Since the Non-CD-SSB 502 is transmitted in the second initial BWP 504 in this manner, the UE 100 can efficiently control communication in the second initial BWP 504 at the same frequency location based on the Non-CD-SSB 502.

The first initial BWP 503 may be an initial BWP for the general UE 100A (that is, Non-RedCap UE). The second initial BWP 504 may be an initial BWP for the specific UE 100B (that is, RedCap UE) having a lower communication capability than that of the general UE 100A. As a result, the specific UE 100B (RedCap UE) can efficiently control communication in the second initial BWP 504 at the same frequency location based on the Non-CD-SSB 502.

In the first embodiment, the identification information may be frequency information indicating the frequency location at which the SSB indicated by the SSB index is transmitted. The frequency information may be a frequency identifier, for example, an absolute radio-frequency channel number (ARFCN). The frequency information may be an RB number indicating a radio resource location in the frequency domain. As a result, the UE 100 can grasp the frequency location at which the SSB indicated by the SSB index is transmitted based on the frequency information as the identification information, and can appropriately receive the SSB indicated by the SSB index.

In the first embodiment, the identification information may be a BWP identifier (bwp-id) indicating a downlink BWP in which the SSB indicated by the SSB index is transmitted. In a case where it is assumed that a BWP in which the CD-SSB 501 is transmitted and a BWP in which the Non-CD-SSB 502 is transmitted are necessarily different, the BWP identifier is suitable as the identification information. The BWP identifier can be configured with a smaller amount of information (that is, a short bit length) than the above-described information indicating the frequency location.

In the first embodiment, the identification information may be an SSB type identifier indicating one of the CD-SSB 501 and the Non-CD-SSB 502 as a type of the SSB indicated by the SSB index. In a case where it is assumed that information necessary for the UE 100 to receive the Non-CD-SSB 502, such as a frequency at which the Non-CD-SSB 502 is transmitted, is separately configured, the SSB type identifier is suitable as the identification information. The SSB type identifier may be, for example, 1-bit flag information such as "0" in the case of the CD-SSB 501 and "1" in the case of the Non-CD-SSB 502. As a result, the identification information can be configured with a small amount of information.

(Configuration of Base Station)

Figure 6:
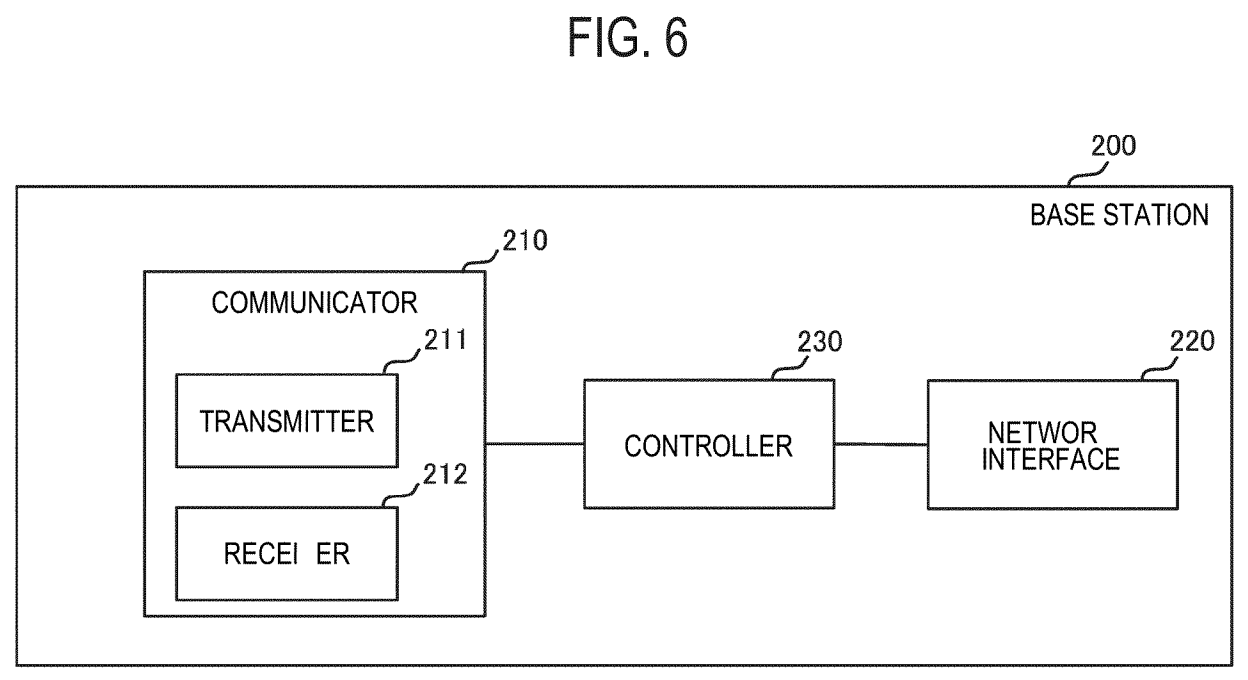

A configuration of the base station 200 according to the embodiment will be described with reference to FIG. 6. The base station 200 includes a communicator 210, a network interface 220, and a controller 230.

For example, the communicator 210 receives a radio signal from the UE 100 and transmits a radio signal to the UE 100. The communicator 210 includes at least one transmitter 211 and at least one receiver 212. The transmitter 211 and the receiver 212 may include an RF circuit. The RF circuit performs analog processing of a signal transmitted and received via the antenna. The RF circuit may include a high frequency filter, an amplifier, a modulator, a low pass filter, and the like.

The network interface 220 transmits and receives a signal to and from a network. The network interface 220 receives, for example, a signal from a neighboring base station connected via an Xn interface, which is an interface between base stations, and transmits the signal to the neighboring base station. In addition, the network interface 220 receives, for example, a signal from the core network apparatus 300 connected via the NG interface, and transmits the signal to the core network apparatus 300.

The controller 230 performs various types of control in the base station 200. The controller 230 controls, for example, communication with the UE 100 via the communicator 210. Furthermore, the controller 230 controls, for example, communication with a node (for example, the neighboring base station and the core network apparatus 300) via the network interface 220. The operation of the base station 200 described above and described later may be an operation under the control of the controller 230. The controller 230 may include at least one processor capable of executing a program and a memory that stores the program. The processor may execute the program to perform the operation of the controller 230. The controller 230 may include a digital signal processor that executes digital processing of a signal transmitted and received via an antenna and an RF circuit. The digital processing includes processing of the protocol stack of the RAN. The memory stores the program executed by the processor, a parameter related to the program, and data related to the program. All or part of the memory may be included in the processor.

The base station 200 according to the first embodiment manages a cell (serving cell) in which the UE 100 exists. The transmitter 211 transmits an SSB in an initial BWP. The receiver 212 receives a PUCCH (UCI) from the UE 100 existing in the cell (serving cell). In the first embodiment, the transmitter 211 transmits, to the UE 100, configuration information including an SSB index indicating the SSB that is referred to by the UE 100 to control the PUCCH transmission and identification information for identifying whether the SSB indicated by the SSB index is the CD-SSB 501 or the Non-CD-SSB 502. Accordingly, even in a case where the Non-CD-SSB 502 is transmitted in the cell (serving cell) in addition to the CD-SSB 501, the UE 100 can appropriately control the PUCCH transmission.

In the base station 200 according to the first embodiment, the receiver 212 receives an SRS from the UE 100 existing in the cell (serving cell). The transmitter 211 transmits, to the UE 100, configuration information including an SSB index indicating an SSB that is referred to by the UE 100 to control the SRS transmission, and identification information for specifying whether the SSB indicated by the SSB index is the CD-SSB 501 or the Non-CD-SSB 502. Accordingly, even in a case where the Non-CD-SSB 502 is transmitted in the cell (serving cell) in addition to the CD-SSB 501, the UE 100 can appropriately control the SRS transmission.

In the base station 200 according to the first embodiment, the transmitter 111 transmits, to the UE 100, configuration information including an SSB index indicating an SSB referred to by the UE 100 to perform the RLM/BFD. The configuration information further includes identification information for specifying whether the SSB indicated by the SSB index is the CD-SSB 501 or the Non-CD-SSB 502. As a result, even in a case where the Non-CD-SSB 502 is transmitted in the cell (serving cell) in addition to the CD-SSB 501, the UE 100 can appropriately perform the RLM/BFD.

In addition, in the base station 200 according to the first embodiment, the transmitter 211 transmits, to the UE 100, configuration information including an SSB index indicating an SSB that is referred to by the UE 100 in order to perform the pathloss estimation for the uplink transmission power control. The configuration information further includes identification information for specifying whether the SSB indicated by the SSB index is the CD-SSB 501 or the Non-CD-SSB 502. As a result, even in a case where the Non-CD-SSB 502 is transmitted in the cell (serving cell) in addition to the CD-SSB 501, the UE 100 can appropriately perform the pathloss estimation for the uplink transmission power control.

(Operation Example According to First Embodiment)

Figure 7:
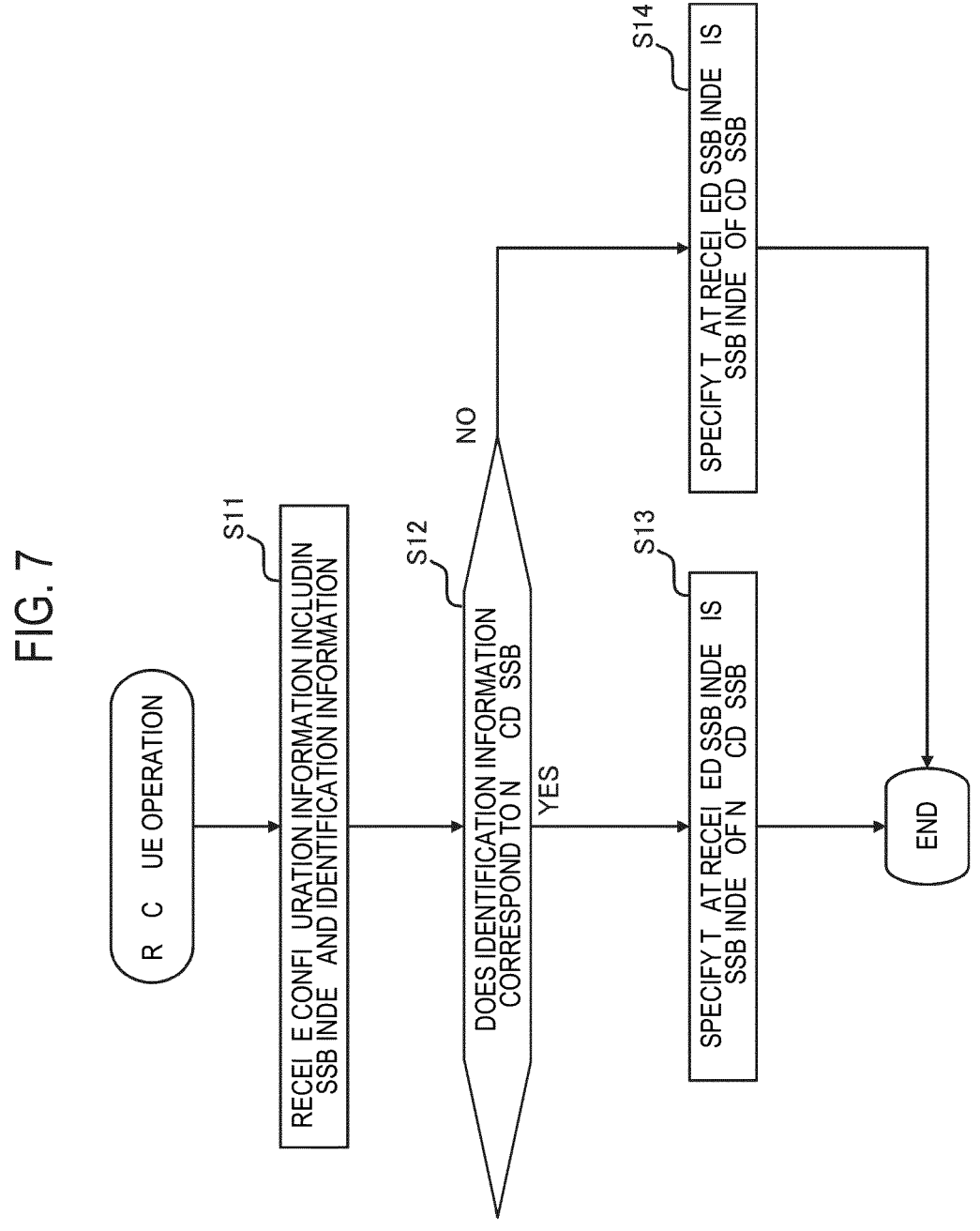
FIG. 7 is a diagram illustrating an example of an SSB specifying operation in the UE according to a first embodiment.

Next, an operation of the mobile communication system 1 according to the first embodiment will be described. First, an example of an SSB specifying operation in the UE 100 according to the first embodiment will be described with reference to FIG. 7. In the operation, the UE 100 may be in the RRC connected state.

In step S11, the receiver 112 receives configuration information including an SSB index and identification information from the base station 200. The configuration information may be transmitted from the base station 200 to the UE 100 by UE-dedicated signaling, for example, an RRC message such as an RRC reconfiguration message.

In step S12, the controller 120 determines whether or not the identification information received in step S11 corresponds to the Non-CD-SSB 502.

In a case where the identification information received in step S11 corresponds to the Non-CD-SSB 502 (step S12: YES), in step S13, the controller 120 specifies that the SSB index received in step S11 is the SSB index of the Non-CD-SSB.

In a case where the identification information received in step S11 corresponds to the CD-SSB 501 (step S12: NO), in step S14, the controller 120 specifies that the SSB index received in step S11 is the SSB index of the CD-SSB 501.

Note that, in a case where a plurality of pieces of configuration information each including an SSB index is configured from the base station 200, the controller 120 may specify, for each piece of configuration information, whether the SSB index is the SSB index of the CD-SSB 501 or the SSB index of the Non-CD-SSB 502 based on identification information corresponding to the SSB index.

(1) Beam Control for PUCCH Transmission

Figure 8:
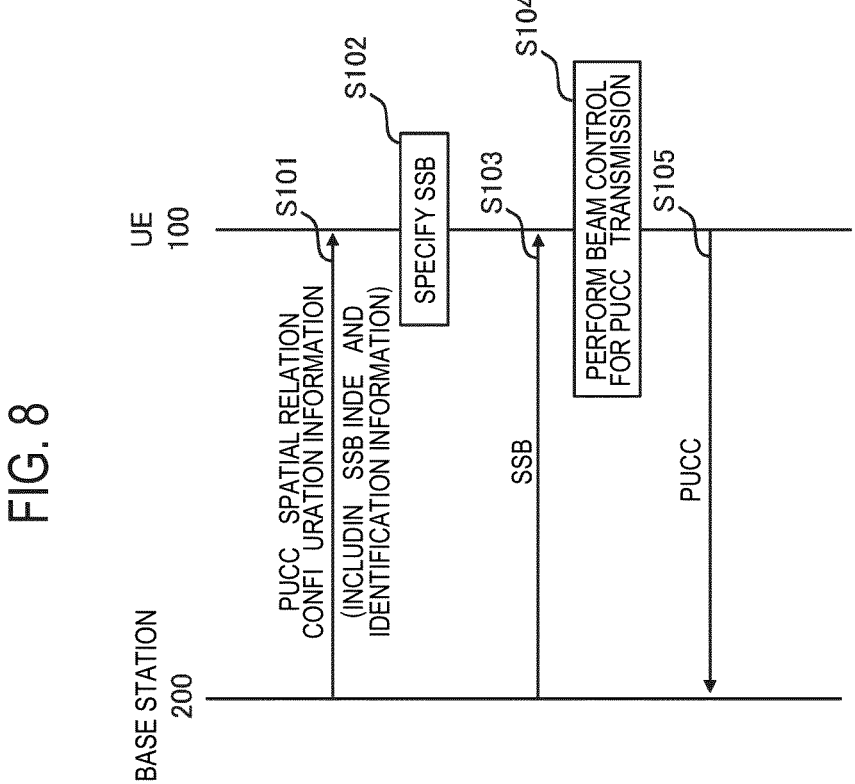
FIG. 8 is a diagram illustrating an example of beam control for physical uplink control channel (PUCCH) transmission according to the first embodiment.

Next, an example of the beam control for the PUCCH transmission according to the first embodiment will be described with reference to FIG. 8.

In step S101, the base station 200 transmits, to the UE 100, the spatial relation configuration information (PUCCH-SpatialRelationInfo) for configuring the spatial setting related to the beam control for the PUCCH transmission. The UE 100 receives the spatial relation configuration information (PUCCH-SpatialRelationInfo).

The spatial relation configuration information (PUCCH-SpatialRelationInfo) includes an SSB index indicating an SSB to be referred to for controlling the PUCCH transmission, and identification information for specifying whether the SSB indicated by the SSB index is the CD-SSB 501 or the Non-CD-SSB 502.

The base station 200 may configure a plurality of pieces of spatial relation configuration information (PUCCH-SpatialRelationInfo) for the UE 100. Each of the plurality of pieces of spatial relation configuration information (PUCCH-SpatialRelationInfo) may include a combination of the SSB index and the identification information. The base station 200 may transmit a PUCCH spatial relation activation/deactivation MAC CE to the UE 100, thereby activating/deactivating the spatial relation configuration information (PUCCH-SpatialRelationInfo).

In step S102, the UE 100 specifies whether the SSB index corresponding to the identification information is the SSB index of the CD-SSB 501 or the SSB index of the Non-CD-SSB 502 based on the identification information received in step S101.

In step S103, the UE 100 receives the SSB specified in step S102 from the base station 200.

In step S104, the UE 100 performs the beam control for the PUCCH transmission by using the SSB received in step S103. Specifically, the UE 100 configured with the SSB index (ssb-Index) as the spatial setting for the PUCCH transmission applies the same spatial domain filter as a spatial domain filter used for reception of the SSB of ssb-Index to the PUCCH transmission. For example, in a case where ssb-Index is configured as the spatial setting for the PUCCH resource and the UE 100 performs transmission in the PUCCH resource, the same spatial domain filter as the spatial domain filter used for reception of the SSB of ssb-Index is used.

In step S105, the UE 100 performs the PUCCH transmission to the base station 200. The base station 200 receives the PUCCH.

An example of spatial relation configuration information (PUCCH-SpatialRelationInfo) 1101 according to the first embodiment will be described with reference to FIGS. 9 and 10. Note that FIGS. 9 and 10 illustrate a description example in the technical specification (TS 38.331) of the RRC layer of 3GPP.

The spatial relation configuration information (PUCCH-SpatialRelationInfo) 1101 may include an identifier (servingCellId) 1102 of a serving cell to which the spatial relation configuration information (PUCCH-SpatialRelationInfo) 1101 is applied. The spatial relation configuration information (PUCCH-SpatialRelationInfo) 1101 may include an SSB index (ssb-Index) 1103 as a setting of a reference signal (referenceSignal).

The spatial relation configuration information (PUCCH-SpatialRelationInfo) 1101 includes, as identification information associated with the SSB index (ssb-Index) 1103, at least one of frequency information (ssbFrequency-r17) 1104, an SSB subcarrier spacing (ssbSubcarrierSpacing-r17) 1105, a BWP identifier (ssb-DL-BWP-r17) 1106, or an SSB type identifier (ssb-Type-r17) 1107. Here, "-r17" means an information element introduced in Release 17 of the 3GPP technical specification, but may also be an information element introduced in Release 18 or later. A condition (Cond) in which such identification information is mandatorily provided may be a condition (NCD-SSB) in which the Non-CD-SSB 502 is transmitted in the separate initial DL BWP configured for the RedCap UE.

(2) Beam Control for SRS Transmission

Figure 11:
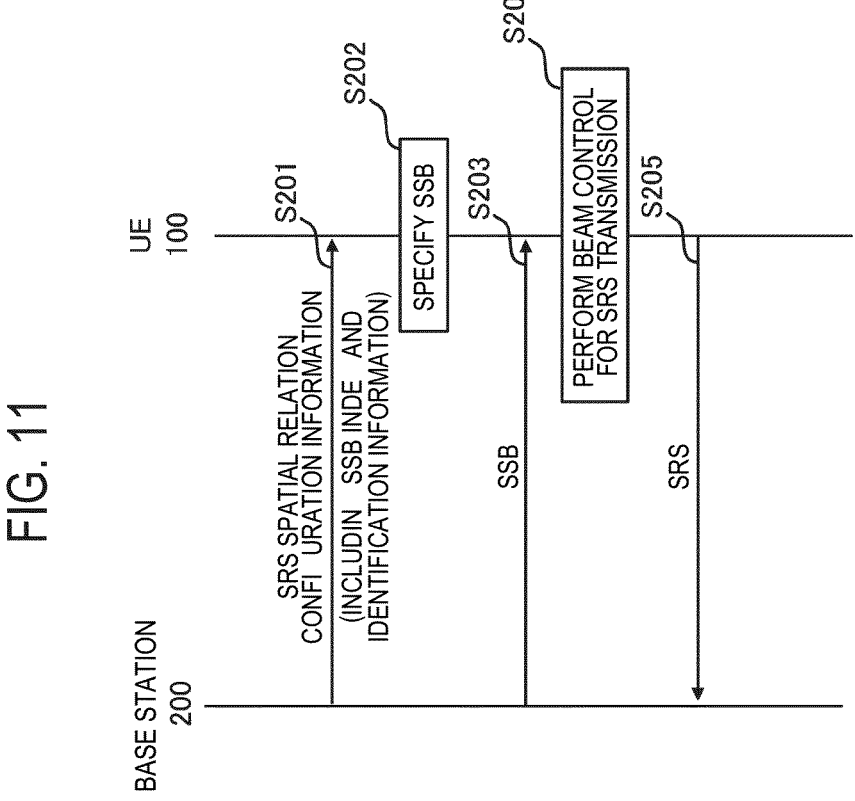
FIG. 11 is a diagram illustrating an example of beam control for sounding reference signal (SRS) transmission according to the first embodiment.

Next, an example of the beam control for the SRS transmission according to the first embodiment will be described with reference to FIG. 11.

In step S201, the base station 200 transmits, to the UE 100, the spatial relation configuration information (SRS-SpatialRelationInfo) for configuring the spatial setting related to the beam control for the SRS transmission. The UE 100 receives the spatial relation configuration information (SRS-SpatialRelationInfo).

The spatial relation configuration information (SRS-SpatialRelationInfo) includes an SSB index indicating an SSB to be referred to for controlling the SRS transmission, and identification information for specifying whether the SSB indicated by the SSB index is the CD-SSB 501 or the Non-CD-SSB 502.

In step S202, the UE 100 specifies whether the SSB index corresponding to the identification information is the SSB index of the CD-SSB 501 or the SSB index of the Non-CD-SSB 502 based on the identification information received in step S201.

In step S203, the UE 100 receives the SSB specified in step S202 from the base station 200.

In step S204, the UE 100 performs the beam control for the SRS transmission by using the SSB received in step S203. Specifically, the UE 100 configured with the SSB index (ssb-Index) as the spatial setting for the SRS transmission applies the same spatial domain filter as a spatial domain filter used for reception of the SSB of ssb-Index to the SRS transmission. For example, in a case where ssb-Index is configured as the spatial setting for the SRS resource and the UE 100 performs transmission in the SRS resource, the same spatial domain filter as the spatial domain filter used for reception of the SSB of ssb-Index is used.

In step S205, the UE 100 performs the SRS transmission to the base station 200. The base station 200 receives the SRS.

An example of spatial relation configuration information (SRS-SpatialRelationInfo) according to the first embodiment will be described with reference to FIGS. 12 and 13. Note that FIGS. 12 and 13 illustrate a description example in the technical specification (TS 38.331) of the RRC layer of 3GPP.

Spatial relation configuration information (SRS-SpatialRelationInfo) 1201 is included in an SRS configuration (SRS-Config). The spatial relation configuration information (SRS-SpatialRelationInfo) 1201 may include an identifier (servingCellId) 1202 of a serving cell to which the spatial relation configuration information (SRS-SpatialRelationInfo) 1201 is applied. The spatial relation configuration information (SRS-SpatialRelationInfo) 1201 may include an SSB index (ssb-Index) 1203 as a setting of a reference signal (referenceSignal).

At least one of frequency information (ssbFrequency-r17) 1204, an SSB subcarrier spacing (ssbSubcarrierSpacing-r17) 1205, a BWP identifier (ssb-DL-BWP-r17) 1206, or an SSB type identifier (ssb-Type-r17) 1207 is provided as identification information associated with the SSB index (ssb-Index) 1203. A condition (Cond) in which such identification information is mandatorily provided may be a condition (NCD-SSB) in which the Non-CD-SSB 502 is transmitted in the separate initial DL BWP configured for the RedCap UE.

(3) RLM/BFD Control

Next, an example of the RLM/BFD control according to the first embodiment will be described with reference to FIG. 14.

In step S301, the base station 200 transmits the RLM reference signal configuration information (RadioLinkMonitoringRS) for configuring the reference signal used for the RLM/BFD to the UE 100. The UE 100 receives the RLM reference signal configuration information (RadioLinkMonitoringRS).

The RLM reference signal configuration information (RadioLinkMonitoringRS) includes an SSB index indicating an SSB to be referred to for performing the RLM/BFD, and identification information for specifying whether the SSB indicated by the SSB index is the CD-SSB 501 or the Non-CD-SSB 502.

In step S302, the UE 100 specifies whether the SSB index corresponding to the identification information is the SSB index of the CD-SSB 501 or the SSB index of the Non-CD-SSB 502 based on the identification information received in step S301.

In step S303, the UE 100 receives the SSB specified in step S302 from the base station 200.

In step S304, the UE 100 performs the RLM/BFD by using the SSB received in step S303. The UE 100 may perform the RLM on a cell basis. In a case where a radio link failure (RLF) is detected by the RLM, the UE 100 may perform processing for recovery from the RLF. The UE 100 may perform the BFD on a beam basis in a cell. In a case where a beam failure is detected by the BFD, the UE 100 may perform processing for recovery from the beam failure.

An example of the RLM reference signal configuration information (RadioLinkMonitoringRS) according to the first embodiment will be described with reference to FIGS. 15 and 16. Note that FIGS. 15 and 16 illustrate a description example in the technical specification (TS 38.331) of the RRC layer of 3GPP.

RLM reference signal configuration information (RadioLinkMonitoringRS) 1301 can configure any one of the BFD (beamFailure) and the RLM (rlf), or both (both) of the BFD (beamFailure) and the RLM (rlf) as a purpose of a corresponding reference signal, that is, a detection target. The RLM reference signal configuration information (RadioLinkMonitoringRS) 1301 may include an SSB index (ssb-Index) 1302 as a setting of a detection resource (detection-Resource).

At least one of frequency information (ssbFrequency-r17) 1303, an SSB subcarrier spacing (ssbSubcarrierSpacing-r17) 1304, a BWP identifier (ssb-DL-BWP-r 17) 1305, or an SSB type identifier (ssb-Type-r17) 1306 is provided as identification information associated with the SSB index (ssb-Index) 1302. A condition (Cond) in which such identification information is mandatorily provided may be a condition (NCD-SSB) in which the Non-CD-SSB 502 is transmitted in the separate initial DL BWP configured for the RedCap UE.

(4) UL Transmission Power Control

Figure 17:
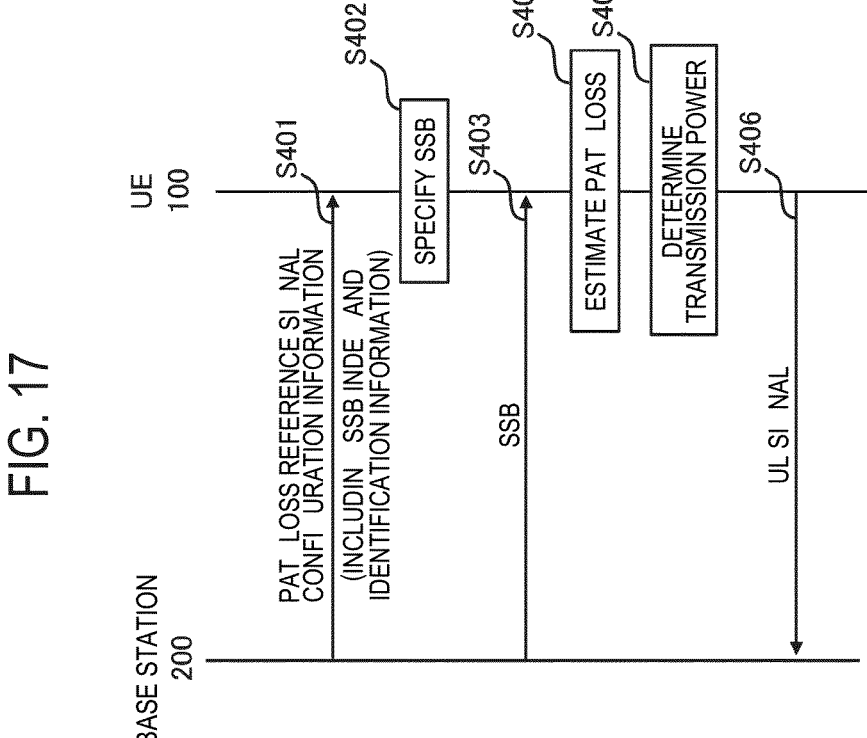
FIG. 17 is a diagram illustrating an example of uplink (UL) transmission power control according to the first embodiment.

Next, an example of the UL transmission power control according to the first embodiment will be described with reference to FIG. 17.

In step S401, the base station 200 transmits the pathloss reference signal configuration information for configuring the reference signal used for the pathloss estimation for the UL transmission power control to the UE 100. The UE 100 receives the pathloss reference signal configuration information. A target of the UL transmission power control is at least one of a PUCCH, a PUSCH, or a service request indicator (SRI)-PUSCH.

The pathloss reference signal configuration information includes an SSB index indicating an SSB to be referred to for the pathloss estimation, and identification information for specifying whether the SSB indicated by the SSB index is the CD-SSB 501 or the Non-CD-SSB 502.

In step S402, the UE 100 specifies whether the SSB index corresponding to the identification information is the SSB index of the CD-SSB 501 or the SSB index of the Non-CD-SSB 502 based on the identification information received in step S401.

In step S403, the UE 100 receives the SSB specified in step S402 from the base station 200.

In step S404, the UE 100 performs the pathloss estimation by using the SSB received in step S403. For example, the UE 100 measures received power of the SSB received from the base station 200 in step S403, and estimates a pathloss by subtracting the received power from transmission power of the SSB. Note that the UE 100 can grasp the transmission power of the SSB from, for example, SSB transmission power information (ss-PBCH-BlockPower) transmitted from the base station 200 in the system information.

In step S405, the UE 100 determines UL transmission power by using the pathloss estimated in step S404. A specific example of a calculation formula for determining the UL transmission power is described below.

In step S406, the UE 100 transmits an UL signal to the base station 200 with the UL transmission power determined in step S405. The UL signal is at least one of a PUCCH signal, a PUSCH signal, or an SRI-PUSCH signal.

An example of the pathloss reference signal configuration information according to the first embodiment will be described with reference to FIGS. 18 to 21. Note that FIGS. 18 to 21 illustrate a description example in the technical specification (TS 38.331) of the RRC layer of 3GPP.

FIGS. 18 and 19 illustrate an example of configuration information (PUCCH-PowerControl) for configuring a UE-specific parameter for transmission power control of the PUCCH. The configuration information (PUCCH-Power-Control) includes pathloss reference signal configuration information (PUCCH-PathlossReferenceRS-r17) 1401. The pathloss reference signal configuration information (PUCCH-PathlossReferenceRS-r17) 1401 includes an SSB index (ssb-Index-r16) 1406 in the case of configuring an SSB (ssb-r17) as a reference signal (referenceSignal-r17). The pathloss reference signal configuration information (PUCCH-PathlossReferenceRS-r17) 1401 includes, as identification information associated with the SSB index (ssb-Index-r16) 1406, at least one of frequency information (ssbFrequency-r17) 1402, an SSB subcarrier spacing (ssb-SubcarrierSpacing-r17) 1403, a BWP identifier (ssb-DL-BWP-r17) 1404, or an SSB type identifier (ssb-Type-r17) 1405. A condition (Cond) in which such identification information is mandatorily provided may be a condition (NCD-SSB) in which the Non-CD-SSB 502 is transmitted in the separate initial DL BWP configured for the RedCap UE.

FIGS. 20 and 21 illustrate an example of configuration information (PUSCH-PowerControl) for configuring a UE-specific parameter for transmission power control of the PUSCH. The configuration information (PUSCH-Power-Control) includes pathloss reference signal configuration information (PUSCH-PathlossReferenceRS-r17) 1501. The pathloss reference signal configuration information (PUSCH-PathlossReferenceRS-r17) 1501 includes an SSB index (ssb-Index-r16) 1506 in the case of configuring an SSB (ssb-r17) as a reference signal (referenceSignal-r17). The pathloss reference signal configuration information (PUSCH-PathlossReferenceRS-r17) 1501 includes, as identification information associated with the SSB index (ssb-Index-r 16) 1506, at least one of frequency information (ssbFrequency-r17) 1502, an SSB subcarrier spacing (ssb-SubcarrierSpacing-r17) 1503, a BWP identifier (ssb-DL-BWP-r17) 1504, or an SSB type identifier (ssb-Type-r17) 1505. A condition (Cond) in which such identification information is mandatorily provided may be a condition (NCD-SSB) in which the Non-CD-SSB 502 is transmitted in the separate initial DL BWP configured for the RedCap UE.

Second Embodiment

A second embodiment will be described mainly with respect to differences from the first embodiment described above.

In the first embodiment described above, an example has been described in which the UE 100 specifies whether an SSB indicated by an SSB index is the CD-SSB 501 or the Non-CD-SSB 502 based on identification information from the base station 200. On the other hand, in the second embodiment, a UE 100 autonomously specifies whether an SSB indicated by an SSB index is a CD-SSB 501 or a Non-CD-SSB 502 even in a case where such identification information (for example, identification information included in spatial relation configuration information (PUCCH-SpatialRelationInfo), identification information included in spatial relation configuration information (SRS-SpatialRelationInfo), identification information included in RLM reference signal configuration information (RadioLinkMonitoringRS), or identification information included in pathloss reference signal configuration information) is not received.

In the UE 100 according to the second embodiment, a transmitter 111 performs PUCCH transmission to a base station 200. The receiver 112 receives, from the base station 200, configuration information including an SSB index indicating the SSB to be referred to for controlling the PUCCH transmission. The controller 120 controls the PUCCH transmission with reference to the SSB indicated by the SSB index included in the received configuration information. In the second embodiment, the controller 120 specifies that the SSB indicated by the SSB index is the Non-CD-SSB 502 in a case where the UE 100 is a specific UE 100B having a lower communication capability than a general UE 100A and a predetermined condition is satisfied. That is, the UE 100 autonomously specifies whether the SSB indicated by the configured SSB index is the CD-SSB 501 or the Non-CD-SSB 502. Therefore, even in a case where the Non-CD-SSB 502 is transmitted in the cell (serving cell) in addition to the CD-SSB 501, the PUCCH transmission can be appropriately controlled.

The predetermined condition is a condition that a first initial BWP 503 for the general UE 100A and a second initial BWP 504 for the specific UE 100B are configured in the cell (serving cell), and the Non-CD-SSB 502 is transmitted in the second initial BWP 504. That is, in a case where the Non-CD-SSB 502 is transmitted in the second initial BWP 504, the UE 100 (the specific UE 100B) specifies that the SSB indicated by the configured SSB index is the Non-CD-SSB 502. Note that the UE 100 (the specific UE 100B) may grasp whether or not the Non-CD-SSB 502 is being transmitted by monitoring (searching) the Non-CD-SSB 502 in the cell (serving cell). The UE 100 (specific UE 100B) may grasp whether or not the Non-CD-SSB 502 is being transmitted based on system information of the cell (serving cell).

In a case where the UE 100 is the specific UE 100B and the predetermined condition is not satisfied, the controller 120 of the UE 100 may specify that the SSB indicated by the configured SSB index is the CD-SSB 501. For example, in a case where the second initial BWP 504 is not configured and/or a case where the Non-CD-SSB 502 is not being transmitted in the cell (serving cell), the UE 100 may specify that the SSB indicated by the configured SSB index is the CD-SSB 501.

In the UE 100 according to the second embodiment, the transmitter 111 performs SRS transmission to the base station 200. The receiver 112 receives, from the base station 200, configuration information including an SSB index indicating the SSB to be referred to for controlling the SRS transmission. The controller 120 controls the SRS transmission with reference to the SSB indicated by the SSB index included in the received configuration information. In the second embodiment, the controller 120 specifies that the SSB indicated by the SSB index is the Non-CD-SSB 502 in a case where the UE 100 is a specific UE 100B having a lower communication capability than a general UE 100A and a predetermined condition is satisfied. That is, the UE 100 autonomously specifies whether the SSB indicated by the configured SSB index is the CD-SSB 501 or the Non-CD-SSB 502. Therefore, even in a case where the Non-CD-SSB 502 is transmitted in the cell (serving cell) in addition to the CD-SSB 501, the SRS transmission can be appropriately controlled.

In addition, in the UE 100 according to the second embodiment, the receiver 112 receives configuration information including an SSB index indicating an SSB to be referred to for performing RLM/BFD from the base station 200. The controller 120 performs the RLM/BFD with reference to the SSB indicated by the SSB index included in the received configuration information. In the second embodiment, the controller 120 specifies that the SSB indicated by the SSB index is the Non-CD-SSB 502 in a case where the UE 100 is a specific UE 100B having a lower communication capability than a general UE 100A and a predetermined condition is satisfied. That is, the UE 100 autonomously specifies whether the SSB indicated by the configured SSB index is the CD-SSB 501 or the Non-CD-SSB 502. Therefore, even in a case where the Non-CD-SSB 502 is transmitted in the cell (serving cell) in addition to the CD-SSB 501, the RLM/BFD can be appropriately controlled.

In the UE 100 according to the second embodiment, the receiver 112 receives, from the base station 200, configuration information including an SSB index indicating an SSB to be referred to for pathloss estimation for uplink transmission power control. The controller 120 performs the pathloss estimation with reference to the SSB indicated by the SSB index included in the received configuration information. In the second embodiment, the controller 120 specifies that the SSB indicated by the SSB index is the Non-CD-SSB 502 in a case where the UE 100 is a specific UE 100B having a lower communication capability than a general UE 100A and a predetermined condition is satisfied. That is, the UE 100 autonomously specifies whether the SSB indicated by the configured SSB index is the CD-SSB 501 or the Non-CD-SSB 502. Therefore, even in a case where the Non-CD-SSB 502 is transmitted in the cell (serving cell) in addition to the CD-SSB 501, the pathloss estimation can be appropriately controlled.

(Operation Example According to Second Embodiment)

Figure 22:
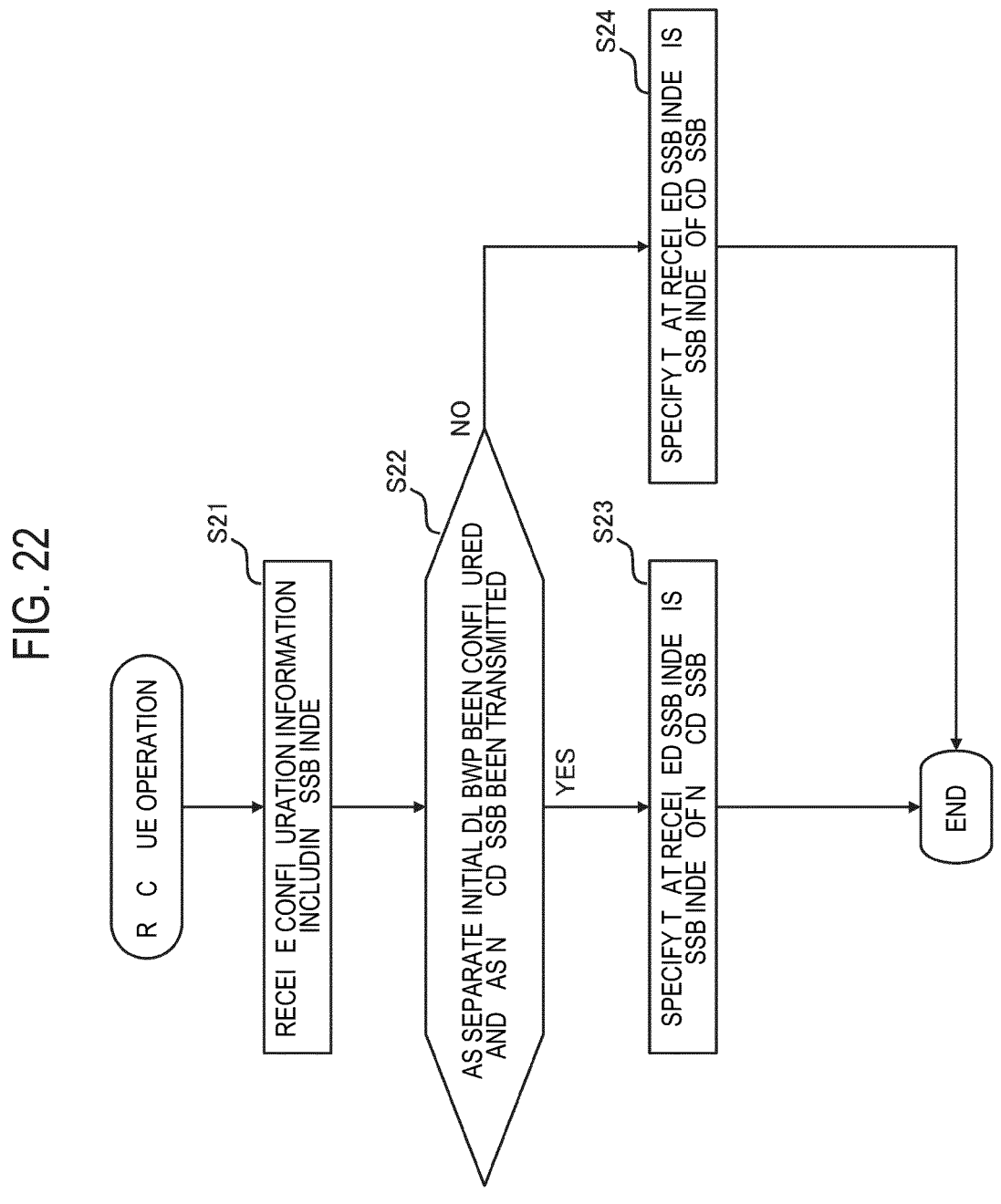
FIG. 22 is a diagram illustrating an example of an SSB specifying operation in a UE 100 according to a second embodiment.

Next, an operation of a mobile communication system 1 according to the second embodiment will be described. First, an example of an SSB specifying operation in the UE 100 according to the second embodiment will be described with reference to FIG. 22. Here, it is assumed that the UE 100 is the specific UE 100B. In the operation, the UE 100 may be in the RRC connected state.

In step S21, the receiver 112 receives configuration information including an SSB index and identification information from the base station 200. The configuration information may be transmitted from the base station 200 to the UE 100 by UE-dedicated signaling, for example, an RRC message such as an RRC reconfiguration message.

In step S22, the controller 120 determines whether or not a predetermined condition is satisfied. The predetermined condition is a condition that the first initial BWP 503 for the general UE 100A and the second initial BWP 504 (separate initial DL BWP) for the specific UE 100B are configured in the serving cell, and the Non-CD-SSB 502 is transmitted in the second initial BWP 504.

In a case where it is determined that the predetermined condition is satisfied (step S22: YES), in step S23, the controller 120 specifies that the SSB index received in step S21 is the SSB index of the Non-CD-SSB.

In a case where it is determined that the predetermined condition is not satisfied (step S22: NO), in step S24, the controller 120 specifies that the SSB index received in step S21 is the SSB index of the CD-SSB 501.

Note that, in a case where a plurality of pieces of configuration information each including an SSB index is configured from the base station 200, the controller 120 may specify, for each piece of configuration information, whether the SSB index is the SSB index of the CD-SSB 501 or the SSB index of the Non-CD-SSB 502 based on whether or not the predetermined condition is satisfied.

(1) Beam Control for PUCCH Transmission

Figure 23:
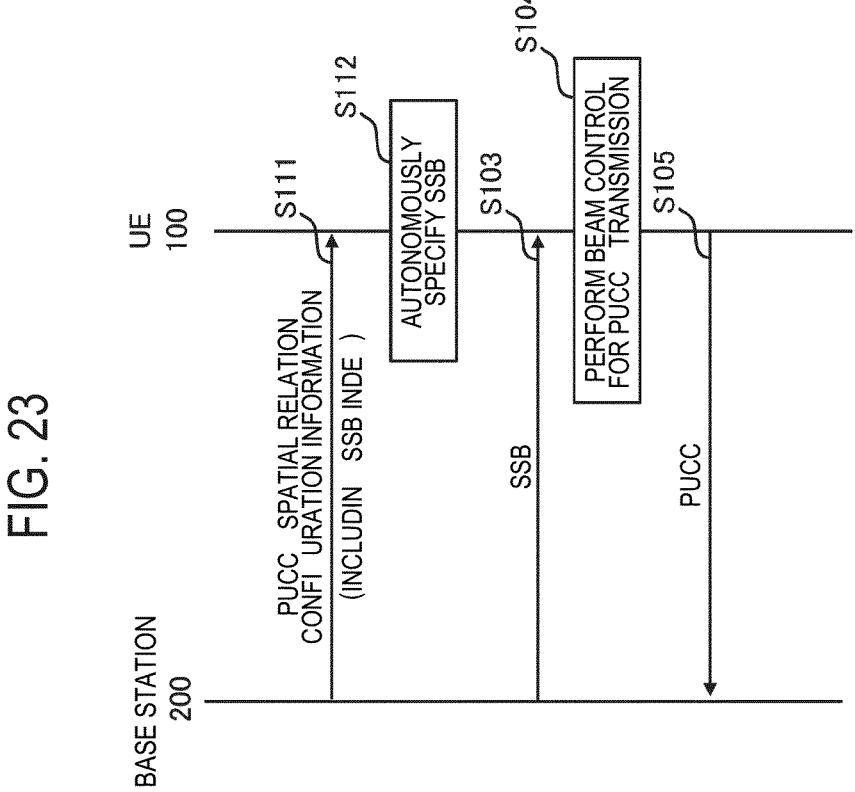
FIG. 23 is a diagram illustrating an example of beam control for PUCCH transmission according to the second embodiment.

Next, an example of beam control for the PUCCH transmission according to the second embodiment will be described with reference to FIG. 23.

In step S111, the base station 200 transmits, to the UE 100, the spatial relation configuration information (PUCCH-SpatialRelationInfo) for configuring a spatial setting related to the beam control for the PUCCH transmission. The UE 100 receives the spatial relation configuration information (PUCCH-SpatialRelationInfo).

The spatial relation configuration information (PUCCH-SpatialRelationInfo) includes an SSB index indicating an SSB to be referred to for controlling the PUCCH transmission. In the second embodiment, the spatial relation configuration information (PUCCH-SpatialRelationInfo) does not have to include identification information for specifying whether the SSB indicated by the SSB index is the CD-SSB 501 or the Non-CD-SSB 502.

The base station 200 may configure a plurality of pieces of spatial relation configuration information (PUCCH-SpatialRelationInfo) for the UE 100. Each of the plurality of pieces of spatial relation configuration information (PUCCH-SpatialRelationInfo) may include a combination of the SSB index and the identification information. The base station 200 may transmit a PUCCH spatial relation activation/deactivation MAC CE to the UE 100, thereby activating/deactivating the spatial relation configuration information (PUCCH-SpatialRelationInfo).

In step S112, the UE 100 autonomously specifies whether the configured SSB index is the SSB index of the CD-SSB 501 or the SSB index of the Non-CD-SSB 502 based on whether or not the predetermined condition is satisfied.

In step S103, the UE 100 receives the SSB specified in step S112 from the base station 200.

In step S104, the UE 100 performs the beam control for the PUCCH transmission by using the SSB received in step S103. Specifically, the UE 100 configured with the SSB index (ssb-Index) as the spatial setting for the PUCCH transmission applies the same spatial domain filter as a spatial domain filter used for reception of the SSB of ssb-Index to the PUCCH transmission. For example, in a case where ssb-Index is configured as the spatial setting for the PUCCH resource and the UE 100 performs transmission in the PUCCH resource, the same spatial domain filter as the spatial domain filter used for reception of the SSB of ssb-Index is used.

In step S105, the UE 100 performs the PUCCH transmission to the base station 200. The base station 200 receives the PUCCH.

(2) Beam Control for SRS Transmission

Figure 24:
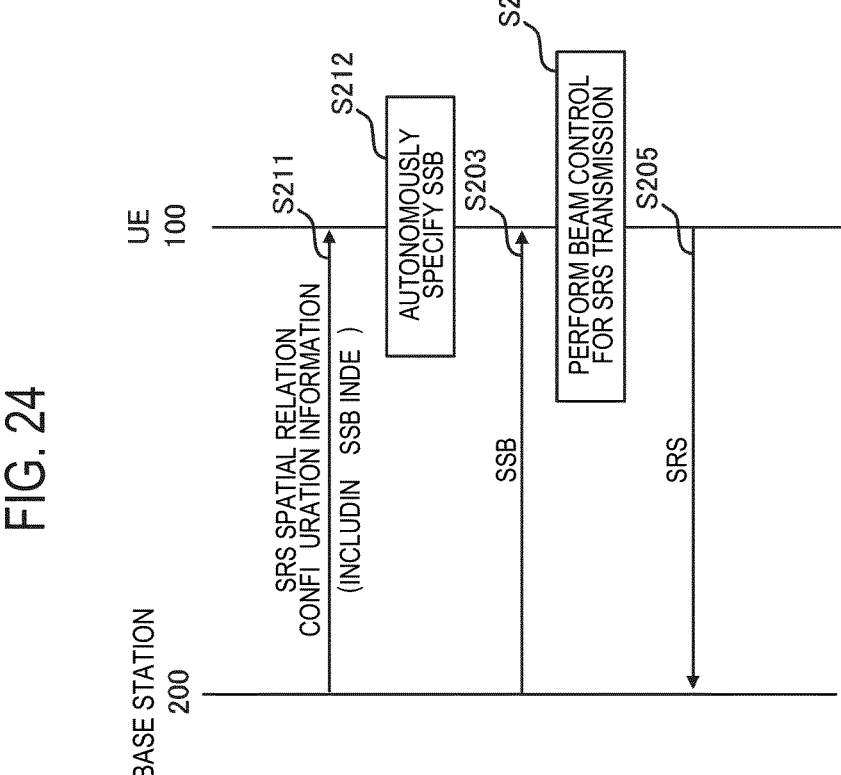
FIG. 24 is a diagram illustrating an example of beam control for SRS transmission according to the second embodiment.

Next, an example of beam control for the SRS transmission according to the second embodiment will be described with reference to FIG. 24.

In step S211, the base station 200 transmits, to the UE 100, the spatial relation configuration information (SRS-SpatialRelationInfo) for configuring a spatial setting related to the beam control for the SRS transmission. The UE 100 receives the spatial relation configuration information (SRS-SpatialRelationInfo).

The spatial relation configuration information (SRS-SpatialRelationInfo) includes an SSB index indicating an SSB to be referred to for controlling the SRS transmission. In the second embodiment, the spatial relation configuration information (SRS-SpatialRelationInfo) does not have to include identification information for specifying whether the SSB indicated by the SSB index is the CD-SSB 501 or the Non-CD-SSB 502.

In step S212, the UE 100 autonomously specifies whether the configured SSB index is the SSB index of the CD-SSB 501 or the SSB index of the Non-CD-SSB 502 based on whether or not the predetermined condition is satisfied.

In step S203, the UE 100 receives the SSB specified in step S212 from the base station 200.

In step S204, the UE 100 performs the beam control for the SRS transmission by using the SSB received in step S203. Specifically, the UE 100 configured with the SSB index (ssb-Index) as the spatial setting for the SRS transmission applies the same spatial domain filter as a spatial domain filter used for reception of the SSB of ssb-Index to the SRS transmission. For example, in a case where ssb-Index is configured as the spatial setting for the SRS resource and the UE 100 performs transmission in the SRS resource, the same spatial domain filter as the spatial domain filter used for reception of the SSB of ssb-Index is used.

In step S205, the UE 100 performs the SRS transmission to the base station 200. The base station 200 receives the SRS.

(3) RLM/BFD Control

Next, an example of the RLM/BFD control according to the second embodiment will be described with reference to FIG. 25.

In step S311, the base station 200 transmits the RLM reference signal configuration information (RadioLink-MonitoringRS) for configuring a reference signal used for the RLM/BFD to the UE 100. The UE 100 receives the RLM reference signal configuration information (RadioLink-MonitoringRS).

The RLM reference signal configuration information (RadioLinkMonitoringRS) includes an SSB index indicating an SSB to be referred to for performing the RLM/BFD. In the second embodiment, the RLM reference signal configuration information (RadioLinkMonitoringRS) does not have to include identification information for specifying whether the SSB indicated by the SSB index is the CD-SSB 501 or the Non-CD-SSB 502.

In step S312, the UE 100 autonomously specifies whether the configured SSB index is the SSB index of the CD-SSB 501 or the SSB index of the Non-CD-SSB 502 based on whether or not the predetermined condition is satisfied.

In step S303, the UE 100 receives the SSB specified in step S312 from the base station 200.

In step S304, the UE 100 performs the RLM/BFD by using the SSB received in step S303. The UE 100 may perform the RLM on a cell basis. In a case where a radio link failure (RLF) is detected by the RLM, the UE 100 may perform processing for recovery from the RLF. The UE 100 may perform the BFD on a beam basis in a cell. In a case

Figure 26:
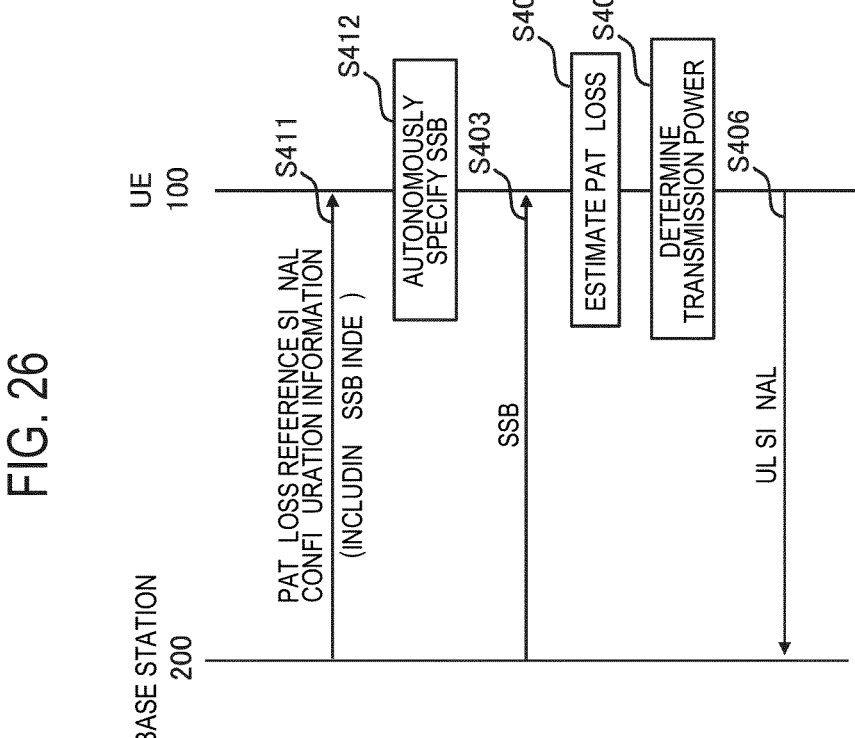
FIG. 26 is a diagram illustrating an example of UL transmission power control according to the second embodiment.

28 where a beam failure is detected by the BFD, the UE 100 may perform processing for recovery from the beam failure.
(4) UL Transmission Power Control Next, an example of the UL transmission power control according to the second embodiment will be described with reference to FIG. 26.

In step S411, the base station 200 transmits the pathloss reference signal configuration information for configuring a reference signal used for the pathloss estimation for the UL transmission power control to the UE 100. The UE 100 receives the pathloss reference signal configuration information. A target of the UL transmission power control is at least one of a PUCCH, a PUSCH, or a service request indicator (SRI)-PUSCH.

The pathloss reference signal configuration information includes an SSB index indicating an SSB to be referred to for the pathloss estimation. The pathloss reference signal configuration information does not have to include identification information for specifying whether the SSB indicated by the SSB index is the CD-SSB 501 or the Non-CD-SSB 502.

In step S412, the UE 100 autonomously specifies whether the configured SSB index is the SSB index of the CD-SSB 501 or the SSB index of the Non-CD-SSB 502 based on whether or not the predetermined condition is satisfied.

In step S403, the UE 100 receives the SSB specified in step S412 from the base station 200.

In step S404, the UE 100 performs the pathloss estimation by using the SSB received in step S403. For example, the UE 100 measures received power of the SSB received from the base station 200 in step S403, and estimates a pathloss by subtracting the received power from transmission power of the SSB. Note that the UE 100 can grasp the transmission power of the SSB from, for example, SSB transmission power information (ss-PBCH-BlockPower) transmitted from the base station 200 in the system information.

In step S405, the UE 100 determines UL transmission power by using the pathloss estimated in step S404.

In step S406, the UE 100 transmits an UL signal to the base station 200 with the UL transmission power determined in step S405. The UL signal is at least one of a PUCCH signal, a PUSCH signal, or an SRI-PUSCH signal.

Here, an example of the UL transmission power in the UE 100 according to the second embodiment will be described with reference to FIGS. 27 to 32. Note that FIGS. 27 to 32 illustrate a description example in the technical specification (TS 38.213) of the PHY layer of 3GPP.

FIG. 27 illustrates a calculation formula for determining the PUSCH transmission power. In the calculation formula, the pathloss (PL) is used. For example, the UE 100 performs transmission power control to increase the PUSCH transmission power as the pathloss increases.

FIG. 28 illustrates an operation example of the UE 100 (specific UE 100B). In step S501, the specific UE 100B (RedCap UE) determines whether or not the predetermined condition is satisfied. Specifically, the specific UE 100B determines whether or not the second initial BWP 504 (separate initial DL BWP) is configured and the Non-CD-SSB 502 is being transmitted in the second initial BWP 504. In a case where the predetermined condition is satisfied, in step S502, the specific UE 100B determines whether or not pathloss reference signal configuration information (PUSCH-PathlossReferenceRS) and enableDefault-BeamPL-ForSRS are not provided or whether or not it is before dedicated higher layer parameters are provided to the specific UE 100B. In a case where the pathloss reference signal configuration information (PUSCH-PathlossReferenceRS) and enableDefaultBeamPL-ForSRS are not provided or it is before the dedicated higher layer parameters are provided to the specific UE 100B, in step S503, the specific UE 100B calculates the pathloss (PL) by using the Non-CD-SSB 502 transmitted in the second initial BWP 504 (separate initial DL BWP) and indicated by the SSB index (SS/PBCH block index).

In a case where the second initial BWP 504 (separate initial DL BWP) is not configured and/or in a case where the Non-CD-SSB 502 is not being transmitted in the second initial BWP 504, the specific UE 100B advances the processing to step S504.

In step S504, the UE 100 determines whether or not the pathloss reference signal configuration information (PUSCH-PathlossReferenceRS) and enableDefault-BeamPL-ForSRS are not provided or whether or not it is before the dedicated higher layer parameters are provided to the UE 100. In a case where the pathloss reference signal configuration information (PUSCH-PathlossReferenceRS) and enableDefaultBeamPL-ForSRS are not provided or it is before the dedicated higher layer parameters are provided to the UE 100, the UE 100 calculates the pathloss (PL) by using the SSB of the SSB index used to acquire an MIB.

FIG. 29 illustrates a calculation formula for determining PUCCH transmission power. In the calculation formula, the pathloss (PL) is used. For example, the UE 100 performs transmission power control to increase the PUCCH transmission power as the pathloss increases.

FIG. 30 illustrates an operation example of the UE 100 (mainly, the specific UE 100B). In step S511, the specific UE 100B (RedCap UE) determines whether or not the predetermined condition is satisfied. Specifically, the specific UE 100B determines whether or not the second initial BWP 504 (separate initial DL BWP) is configured and the Non-CD-SSB 502 is being transmitted in the second initial BWP 504. In a case where the predetermined condition is satisfied, in step S512, the specific UE 100B determines whether or not pathloss reference signal configuration information (PathlossReferenceRS) is not provided or whether or not it is before dedicated higher layer parameters are provided to the specific UE 100B. In a case where the pathloss reference signal configuration information (PathlossReferenceRS) is not provided or it is before the dedicated higher layer parameters are provided to the specific UE 100B, in step S513, the specific UE 100B calculates the pathloss (PL) by using the Non-CD-SSB 502 transmitted in the second initial BWP 504 (separate initial DL BWP) and indicated by the SSB index (SS/PBCH block index).

In a case where the second initial BWP 504 (separate initial DL BWP) is not configured and/or in a case where the Non-CD-SSB 502 is not being transmitted in the second initial BWP 504, the specific UE 100B advances the processing to step S514.

In step S514, the UE 100 determines whether or not the pathloss reference signal configuration information (PathlossReferenceRS) is not provided or whether or not it is before the dedicated higher layer parameters are provided to the UE 100. In a case where the pathloss reference signal configuration information (PUCCH-PathlossReferenceRS) is not provided or it is before the dedicated higher layer parameters are provided to the UE 100, the UE 100 calculates the pathloss (PL) by using the SSB of the SSB index used to acquire the MIB.

FIG. 31 illustrates a calculation formula for determining SRS transmission power. In the calculation formula, the pathloss (PL) is used. For example, the UE 100 performs transmission power control to increase the SRS transmission power as the pathloss increases.

FIG. 32 illustrates an operation example of the UE 100 (specific UE 100B). In step S521, the specific UE 100B (RedCap UE) determines whether or not the predetermined condition is satisfied. Specifically, the specific UE 100B determines whether or not the second initial BWP 504 (separate initial DL BWP) is configured and the Non-CD-SSB 502 is being transmitted in the second initial BWP 504. In a case where the predetermined condition is satisfied, in step S522, the specific UE 100B determines whether or not the pathloss reference signal configuration information (PathlossReferenceRS) or SRS-PathlossReferenceRS-Id is not provided or whether or not it is before dedicated higher layer parameters are provided to the specific UE 100B. In a case where the pathloss reference signal configuration information (PathlossReferenceRS) or SRS-PathlossReferenceRS-Id is not provided or it is before the dedicated higher layer parameters are provided to the specific UE 100B, in step S523, the specific UE 100B calculates the pathloss (PL) by using the Non-CD-SSB 502 transmitted in the second initial BWP 504 (separate initial DL BWP) and indicated by the SSB index (SS/PBCH block index).

In a case where the second initial BWP 504 (separate initial DL BWP) is not configured and/or in a case where the Non-CD-SSB 502 is not being transmitted in the second initial BWP 504, the specific UE 100B advances the processing to step S524.

In step S524, the UE 100 determines whether or not the pathloss reference signal configuration information (PathlossReferenceRS) or SRS-PathlossReferenceRS-Id is not provided or whether or not it is before the dedicated higher layer parameters are provided to the specific UE 100B. In a case where the pathloss reference signal configuration information (PathlossReferenceRS) or SRS-PathlossReferenceRS-Id is not provided or it is before the dedicated higher layer parameters are provided to the UE 100, the UE 100 calculates the pathloss (PL) by using the SSB of the SSB index used to acquire the MIB.

Other Embodiments

The second embodiment may be used in combination with the first embodiment described above. For example, the UE 100 may perform the operation according to the second embodiment before receiving the identification information from the base station 200 and then perform the operation according to the first embodiment after receiving the identification information from the base station 200.

The operation sequence (and the operation flow) in the above-described embodiment may not necessarily be executed in time series according to the order described in the flow diagram or the sequence diagram. For example, the steps in the operation may be performed in an order different from the order described as the flow diagram or the sequence diagram, or may be performed in parallel. In addition, some of the steps in the operation may be removed and additional steps may be added to the processing. Furthermore, the operation sequence (and the operation flow) in the above-described embodiment may be performed separately and independently, or may be performed by combining two or more operation sequences (and operation flows). For example, some steps of one operation flow may be added to another operation flow, or some steps of one operation flow may be replaced with some steps of another operation flow.

In the above-described embodiments, a mobile communication system based on the NR is described as an example of the mobile communication system 1. However, the mobile communication system 1 is not limited to this example. The mobile communication system 1 may be a system conforming to a TS of any of LTE or another generation system (for example, the sixth generation) of the 3GPP standard. The base station 200 may be an eNB that provides evolved universal terrestrial radio access (E-UTRA) user plane and control plane protocol terminations towards the UE 100 in LTE. The mobile communication system 1 may be a system conforming to a TS defined in a standard other than the 3GPP standard. The base station 200 may be IAB (Integrated Access and Backhaul) or IAB node.

A program for causing a computer to execute each processing performed by the UE 100 or the base station 200 may be provided. The program may be recorded on a computer readable medium. The program can be installed in the computer by using the computer readable medium. Here, the computer readable medium on which the program is recorded may be a non-transitory recording medium. The non-transitory recording medium is not particularly limited, but may be, for example, a recording medium such as a CD-ROM (Compact Disk Read Only Memory) or a DVD-ROM (Digital Versatile Disc Read Only Memory). In addition, a circuit that executes each processing performed by the UE 100 or the base station 200 may be integrated, and at least a part of the UE 100 or the base station 200 may be configured as a semiconductor integrated circuit (chipset, SoC(System On Chip)).

In the above-described embodiment, "transmit (transmit)" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive (receive)" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire. Similarly, "acquire (obtain/acquire)" may mean to acquire information from stored information, may mean to acquire information from information received from another node, or may mean to acquire the information by generating information. Similarly, "include (include)" and "comprise (comprise)" do not mean to include only the listed items, but mean that the terms may include only the listed items or may include additional items in addition to the listed items. Similarly, in the present disclosure, "or (or)" does not mean exclusive OR but means OR.

Although the embodiment has been described in detail with reference to the drawings, the specific configuration is not limited to the above description, and various design changes and the like can be made without departing from the gist.

Although the present disclosure has been described in accordance with examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

Supplementary Notes

Features related to the above-described embodiments are additionally described.

Supplementary Note 1

A user equipment (100) that receives a synchronization signal block (synchronization signal/physical broadcast channel (PBCH) block (SSB)) transmitted in an initial bandwidth part (BWP) which is a part of a bandwidth of a cell of a base station (200), the user equipment (100) including:
  a receiver (112) configured to receive, from the base station (200), configuration information including an SSB index indicating the SSB to be referred to for performing at least one of operations of radio link monitoring (RLM) and beam failure detection (BFD); and
  a controller (120) configured to perform the at least one operation with reference to the SSB indicated by the SSB index included in the configuration information,
  in which the receiver (112) is configured to receive the configuration information further including identification information for specifying whether the SSB indicated by the SSB index is a cell-defining SSB (501) or a non-cell-defining SSB (502).

Supplementary Note 2

The user equipment (100) according to Supplementary Note 1,
  in which the cell-defining SSB (501) is an SSB transmitted in a first initial BWP (503) of the cell, and
  the non-cell-defining SSB (502) is an SSB transmitted in a second initial BWP (504) different from the first initial BWP (503) in the cell.

Supplementary Note 3

The user equipment (100) according to Supplementary Note 1 or 2,
  in which the first initial BWP (503) is an initial BWP for a general user equipment (100A), and
  the second initial BWP (504) is an initial BWP for a specific user equipment (100B) having a lower communication capability than that of the general user equipment (100A).

Supplementary Note 4

The user equipment (100) according to any one of Supplementary Notes 1 to 3,
  in which the identification information is information indicating a frequency location at which the SSB indicated by the SSB index is transmitted.

Supplementary Note 5

The user equipment (100) according to any one of Supplementary Notes 1 to 3,
  in which the identification information is a BWP identifier indicating a downlink BWP in which the SSB indicated by the SSB index is transmitted.

Supplementary Note 6

The user equipment (100) according to any one of Supplementary Notes 1 to 3, in which the identification information is an SSB type identifier indicating one of the cell-defining SSB (501) and the non-cell-defining SSB (502) as a type of the SSB indicated by the SSB index.

Supplementary Note 7

A user equipment (100) that receives a synchronization signal block (synchronization signal/physical broadcast channel (PBCH) block (SSB)) transmitted in an initial bandwidth part (BWP) which is a part of a bandwidth of a cell of a base station (200), the user equipment (100) including:
  a receiver (112) configured to receive, from the base station (200), configuration information including an SSB index indicating the SSB to be referred to for performing at least one of operations of radio link monitoring (RLM) and beam failure detection (BFD); and
  a controller (120) configured to perform the at least one operation with reference to the SSB indicated by the SSB index included in the configuration information,
  in which the controller (120) is configured to specify that the SSB indicated by the SSB index is a non-cell-defining SSB (502) in a case where the user equipment (100) is a specific user equipment (100B) having a lower communication capability than that of a general user equipment (100A), and a predetermined condition is satisfied.

Supplementary Note 8

The user equipment (100) according to Supplementary Note 7,
  in which the predetermined condition is a condition that a first initial BWP (503) for the general user equipment (100A) and a second initial BWP (504) for the specific user equipment (100B) are configured in the cell, and the non-cell-defining SSB (502) is transmitted in the second initial BWP (504).

Supplementary Note 9

The user equipment (100) according to the Supplementary Note 7 or 8,
  in which the controller (120) is configured to specify that the SSB indicated by the SSB index is a cell-defining SSB (501) in a case where the user equipment (100) is the specific user equipment (100B), and the predetermined condition is not satisfied.

Supplementary Note 10

The user equipment (100) according to any one of Supplementary Notes 1 to 9,
  in which the configuration information includes RLM reference signal configuration information for configuring a reference signal used for at least one of the RLM or the BFD.

Supplementary Note 11

The user equipment (100) according to any one of Supplementary Notes 1 to 10,
  in which the controller (120) is configured to perform the at least one operation by using the non-cell-defining SSB (502) in a case where the SSB indicated by the SSB index is specified as the non-cell-defining SSB (502).

Supplementary Note 12

A base station (200) that manages a cell, the base station (200) including:

a transmitter (211) configured to transmit, to a user equipment (100), a synchronization signal block (synchronization signal/physical broadcast channel (PBCH) block (SSB)) in an initial bandwidth part (BWP) which is a part of a bandwidth of the cell, in which the transmitter (111) is configured to further transmit, to the user equipment (100), configuration information including an SSB index indicating the SSB to be referred to by the user equipment (100) to perform at least one of operations of radio link monitoring (RLM) and beam failure detection (BFD), and the configuration information further includes identification information for specifying whether the SSB indicated by the SSB index is a cell-defining SSB (501) or a non-cell-defining SSB (502).

Supplementary Note 13

A communication method executed by a user equipment (100) that receives a synchronization signal block (synchronization signal/physical broadcast channel (PBCH) block (SSB)) transmitted in an initial bandwidth part (BWP) which is a part of a bandwidth of a cell of a base station (200), the communication method including the steps of:

receiving (S301), from the base station (200), configuration information including an SSB index indicating the SSB to be referred to for performing at least one of operations of radio link monitoring (RLM) and beam failure detection (BFD); and performing (S302, S303, and S304) the at least one operation with reference to the SSB indicated by the SSB index included in the configuration information, in which the receiving includes receiving the configuration information further including identification information for specifying whether the SSB indicated by the SSB index is a cell-defining SSB (501) or a non-cell-defining SSB (502).

Supplementary Note 14

A communication method executed by a user equipment (100) that receives a synchronization signal block (synchronization signal/physical broadcast channel (PBCH) block (SSB)) transmitted in an initial bandwidth part (BWP) which is a part of a bandwidth of a cell of a base station (200), the communication method including the steps of:

receiving (S311), from the base station (200), configuration information including an SSB index indicating the SSB to be referred to for performing at least one of operations of radio link monitoring (RLM) and beam failure detection (BFD); and performing (S312, S303, and S304) the at least one operation with reference to the SSB indicated by the SSB index included in the configuration information, in which the controlling includes specifying (S312) that the SSB indicated by the SSB index is a non-cell-defining SSB (502) in a case where the user equipment (100) is a specific user equipment (100B) having a lower communication capability than that of a general user equipment (100A), and a predetermined condition is satisfied.

The invention claimed is:

1. A communication apparatus comprising a receiver configured to receive from a base station, system information including information for indicating a first initial downlink Bandwidth Part (BWP), a bwp-ID of the first initial downlink BWP being defined as "0", and a Radio Resource Control (RRC) Reconfiguration message including configuration information, the configuration information including information for indicating a Synchronization Signal/Physical Broadcast Channel (PBCH) block (SSB) index referred for performing at least one of Radio Link Monitoring (RLM) and Beam Failure Detection (BFD), and a controller configured to perform at least one of the RLM and the BFD with reference to a SSB indicated by the SSB index, wherein the controller is configured to in an RRC connected state, in a case where the configuration information includes information for indicating an absolute radio frequency channel number of a non-cell SSB, based on information for indicating a second initial downlink BWP being included in the system information, identify the SSB indicated by the SSB index as the non-cell defining SSB transmitted on the second initial downlink BWP, wherein a bwp-ID of the second initial downlink BWP is defined as "0".

2. The communication apparatus according to claim 1, wherein the controller is configured to perform the at least one of the RLM and the BFD using the non-cell defining SSB.

3. The communication apparatus according to claim 1, wherein the controller is configured to, in a case where the configuration information does not include the information for indicating the absolute radio frequency channel number of the non-cell defining SSB, identify the SSB indicated by the SSB index as a cell defining SSB.

4. The communication apparatus according to claim 1, wherein the configuration information includes information for configuring a reference signal used in at least one of the RLM and the BFD.

5. The communication apparatus according to claim 1, wherein the receiver is configured to receive from the base station, the system information including information for indicating a first initial uplink BWP and information for indicating a second initial uplink BWP.

6. A base station comprising a transmitter configured to transmit to a communication apparatus, system information including information for indicating a first initial downlink Bandwidth Part (BWP), a bwp-ID of the first initial downlink BWP being defined as "0", and a Radio Resource Control (RRC) Reconfiguration message including configuration information, the configuration information including information for indicating a Synchronization Signal/Physical Broadcast Channel (PBCH) block (SSB) index referred for performing at least one of Radio Link Monitoring (RLM) and Beam Failure Detection (BFD), and a controller configured to control at least one of the RLM and the BFD with reference to a SSB indicated by the SSB index, wherein the controller is configured to in a case where the communication apparatus is in an RRC connected state and the configuration information includes information for indicating an absolute radio frequency channel number of a non-cell defining SSB, based on information for indicating a second initial downlink BWP being included in the system information, the SSB indicated by the SSB index is identified as the non-cell defining SSB transmitted on the second initial downlink BWP, wherein a bwp-ID of the second initial downlink BWP is defined as "0".

7. The base station according to claim 6, wherein the controller is configured to control the at least one of the RLM and the BFD using the non-cell defining SSB.

8. The base station according to claim 6, wherein in a case where the configuration information does not include the information for indicating the absolute radio frequency channel number of the non-cell defining SSB, the SSB indicated by the SSB index is identified as a cell defining SSB.

9. The base station according to claim 6, wherein the configuration information includes information for configuring a reference signal used in at least one of the RLM and the BFD.

10. The base station according to claim 6, wherein the transmitter is configured to transmit to the communication apparatus, the system information including information for indicating a first initial uplink BWP and information for indicating a second initial uplink BWP.

11. A communication method performed by a communication apparatus, the communication method comprising receiving from a base station, system information including information for indicating a first initial downlink Bandwidth Part (BWP), a bwp-ID of the first initial downlink BWP being defined as "0";

receiving from the base station, a Radio Resource Control (RRC) Reconfiguration message including configuration information, the configuration information including information for indicating a Synchronization Signal/Physical Broadcast Channel (PBCH) block (SSB) index referred for performing at least one of Radio Link Monitoring (RLM) and Beam Failure Detection (BFD); and performing at least one of the RLM and the BFD with reference to a SSB indicated by the SSB index, wherein in an RRC connected state, in a case where the configuration information includes information for indicating an absolute radio frequency channel number of a non-cell defining SSB, based on information for indicating a second initial downlink BWP being included in the system information, identifying the SSB indicated by the SSB index as the non-cell defining SSB transmitted on the second initial downlink BWP, wherein a bwp-ID of the second initial downlink BWP is defined as "0".

12. The communication method according to claim 11, further comprising performing the at least one of the RLM and the BFD using the non-cell defining SSB.

13. The communication method according to claim 11, further comprising in a case where the configuration information does not include the information for indicating the absolute radio frequency channel number of the non-cell defining SSB, identifying the SSB indicated by the SSB index as a cell defining SSB.

14. The communication method according to claim 11, wherein the configuration information includes information for configuring a reference signal used in at least one of the RLM and the BFD.

15. The communication method according to claim 11, further comprising receiving from the base station, the system information including information for indicating a first initial uplink BWP and information for indicating a second initial uplink BWP.

* * * * *